United States Patent [19]

Yamada

[11] Patent Number: 4,748,513
[45] Date of Patent: May 31, 1988

[54] IMAGE PROCESSING SYSTEM

[75] Inventor: Masanori Yamada, Kawasaki, Japan

[73] Assignee: Canon Kabushiki Kaisha, Tokyo, Japan

[21] Appl. No.: 825,103

[22] Filed: Jan. 31, 1986

[30] Foreign Application Priority Data

Jan. 31, 1985 [JP] Japan .................. 60-017064

[51] Int. Cl.⁴ .................................. H04N 1/04
[52] U.S. Cl. ...................... 358/280; 358/293
[58] Field of Search .......... 358/280, 260, 256, 296, 358/293; 364/518

[56] References Cited

U.S. PATENT DOCUMENTS

| | | | |
|---|---|---|---|
| 4,505,576 | 3/1985 | Sugiura et al. | 355/14 R |
| 4,527,885 | 7/1985 | Ayata et al. | 358/280 |
| 4,551,769 | 11/1985 | Satoh | 358/296 |
| 4,589,035 | 5/1986 | Yamanishi et al. | 358/296 |
| 4,597,018 | 6/1986 | Sonobe et al. | 358/296 |
| 4,597,051 | 6/1986 | Beausoleil et al. | 364/523 |
| 4,639,791 | 1/1987 | Masaki | 358/300 |
| 4,695,895 | 9/1987 | Nagashima | 358/280 |

Primary Examiner—Edward L. Coles, Sr.
Attorney, Agent, or Firm—Fitzpatrick, Cella, Harper & Scinto

[57] ABSTRACT

An image processing system has a reader with an image sensor, a retention memory unit connected to the reader, and a printer connected to the retention memory unit. The reader, the retention memory unit and the printer have a hierarchical control structure in order named. The retention memory unit has dynamic RAMs each of which stores image data of at least one page. The image data entered at the reader is selectively stored in the RAMs. When an operator wishes to form the image represented by the image data on a plurality of copying sheets, the corresponding original is scanned only once before copying on the first copy sheet. For the second and subsequent sheets, the image signal is selectively read out from the RAMs. The signal readout is inhibited by selectors and gates in the retention memory unit in response to logical states of corresponding flags at the end of copying.

14 Claims, 27 Drawing Sheets

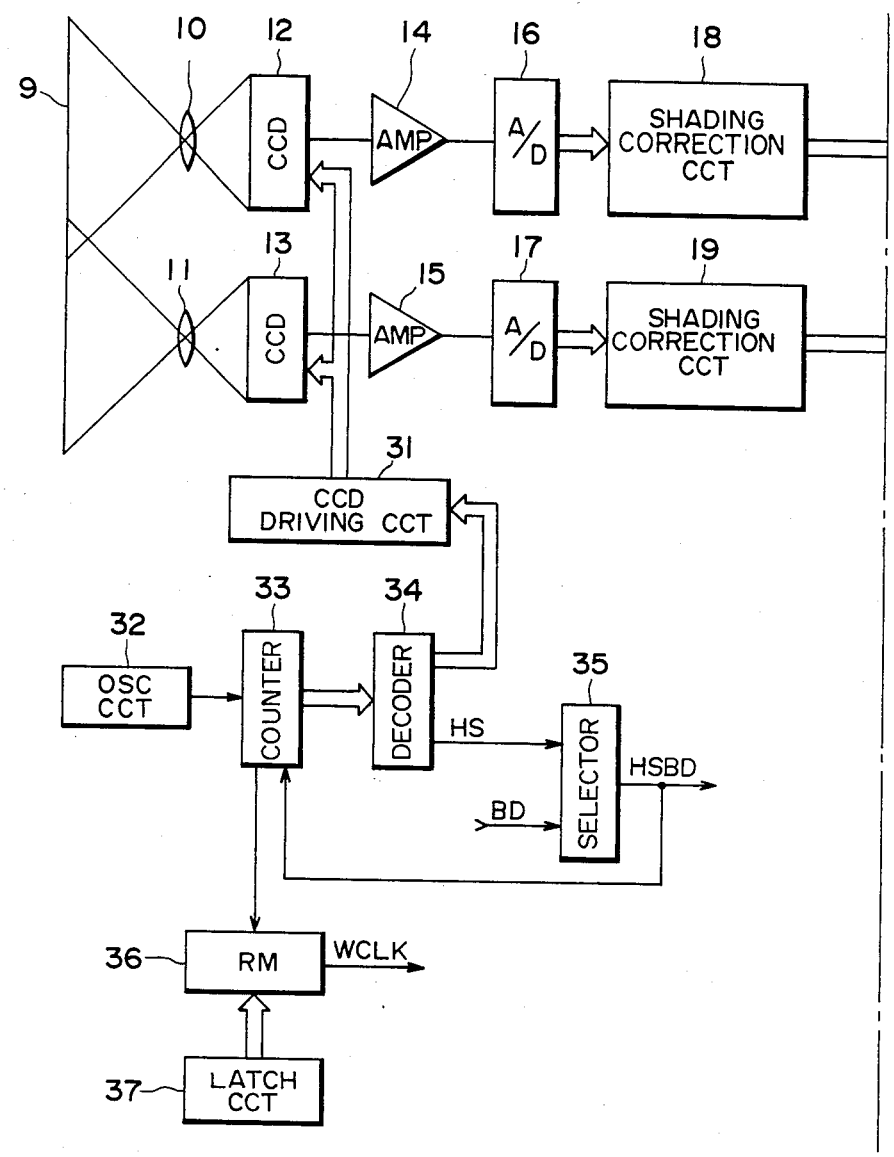
FIG. 2(a)A

FIG. 2(a)B

STORAGE COMPLETED. PLEASE EXCHANGE ORIGINAL

FIG. 13-1

NO MEMORY IMAGE AVAILABLE TO OVERLAY

FIG. 13-2

MEMORY IMAGE IS UNABLE TO BE MONITORED

FIG. 13-3

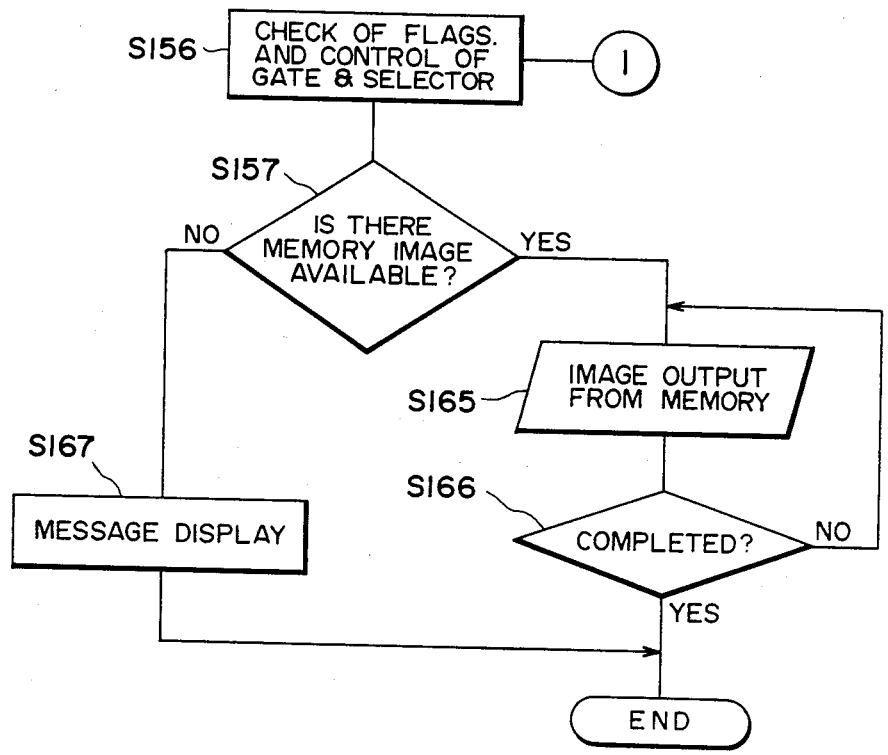
FIG. 15(f)A

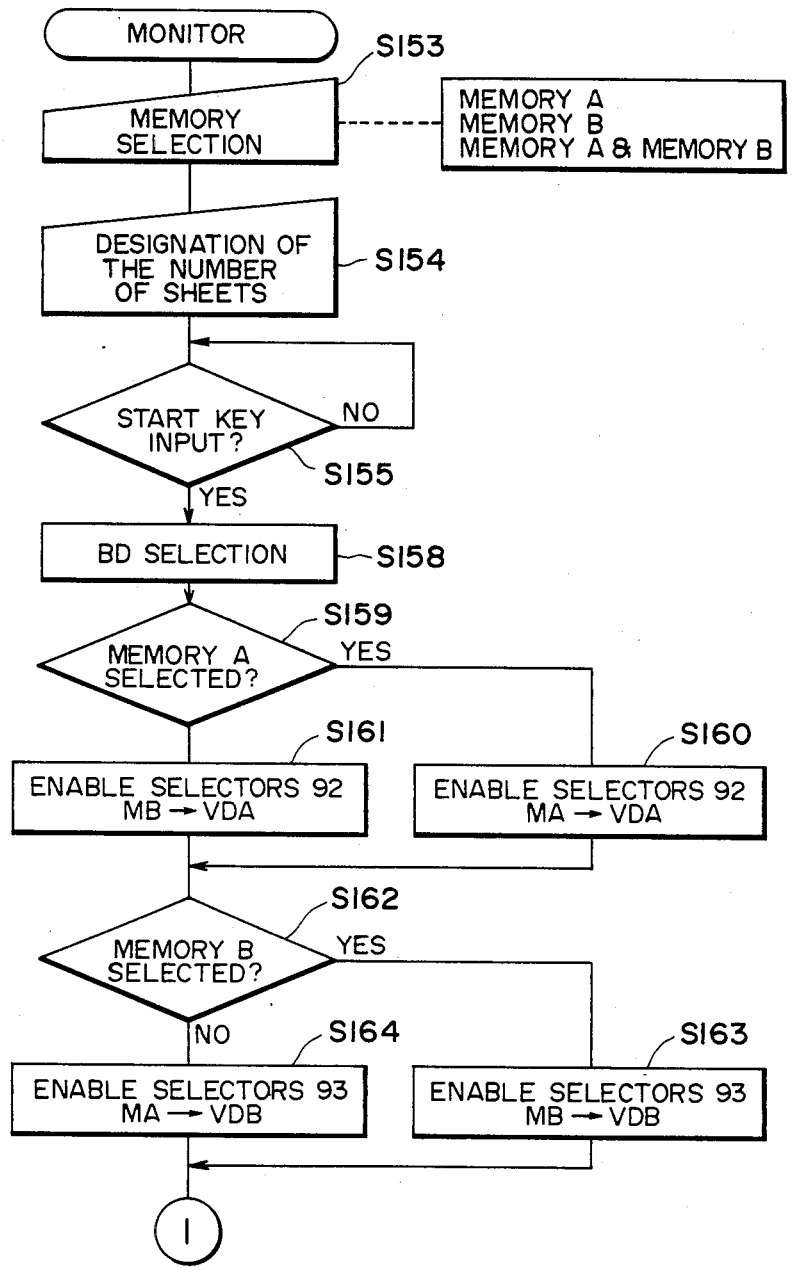
FIG. 15(f)B

IMAGE PROCESSING SYSTEM

BACKGROUND OF THE INVENTION

1. Field of the Invention

The present invention relates to an image processing system and, more particularly, to an image processing system for forming an image in response to an image signal generated by an image output unit such as an image reader.

2. Description of the Prior Art

Various conventional image processing systems have been proposed which use image sensors such as CCDs for optically reading an original and forming images in response to optically read image signals. In these conventional processing systems, one-to-one correspondence is established between the image signal output unit and an image forming unit. For example, when an operator wishes to copy an image from an original a number of times, the original must be repeatedly read for the specified number of times.

Another conventional image forming system with an image signal memory has been proposed. The read image signals are temporarily stored in the memory, and an identical image signal is repeatedly read out to form the corresponding image a number of times.

The same image can be repeatedly copied in the above system, so image formation speed is improved.

When the image signal stored by an operator in the memory is not erased, the signal may be mistakenly read out by the next operator, and an image undesirably copied. If the image signal represented a confidential document, for example, confidential information could leak out to many persons.

SUMMARY OF THE INVENTION

The present invention has been made in consideration of the above situation, and has as its object to provide an image processing system which improves image processing efficiency and eliminates image processing inconvenience.

It is another object of the present invention to protect information confidentiality by preventing an image signal from being accidentally read out.

It is still another object of the present invention to provide an image processing system which can effectively copy an original image.

It is still another object of the present invention to provide an image processing system which can mix image signals.

It is still another object of the present invention to provide an image processing system which has a memory for storing at least a one-page image signal and which effectively utilizes this memory.

The above and other objects, features and advantages of the present invention will be apparent from the following detailed description in conjunction with the accompanying drawings.

DETAILED DESCRIPTION OF THE DRAWINGS

FIG. 1 is a perspective view showing the outer appearance of an image processing system to which the present invention is applied;

FIG. 2(a), composed of FIGS. 2(a)A and 2(a)B, and FIG. 2(b) are block diagrams showing the internal arrangement of a reader;

Figure 2A:
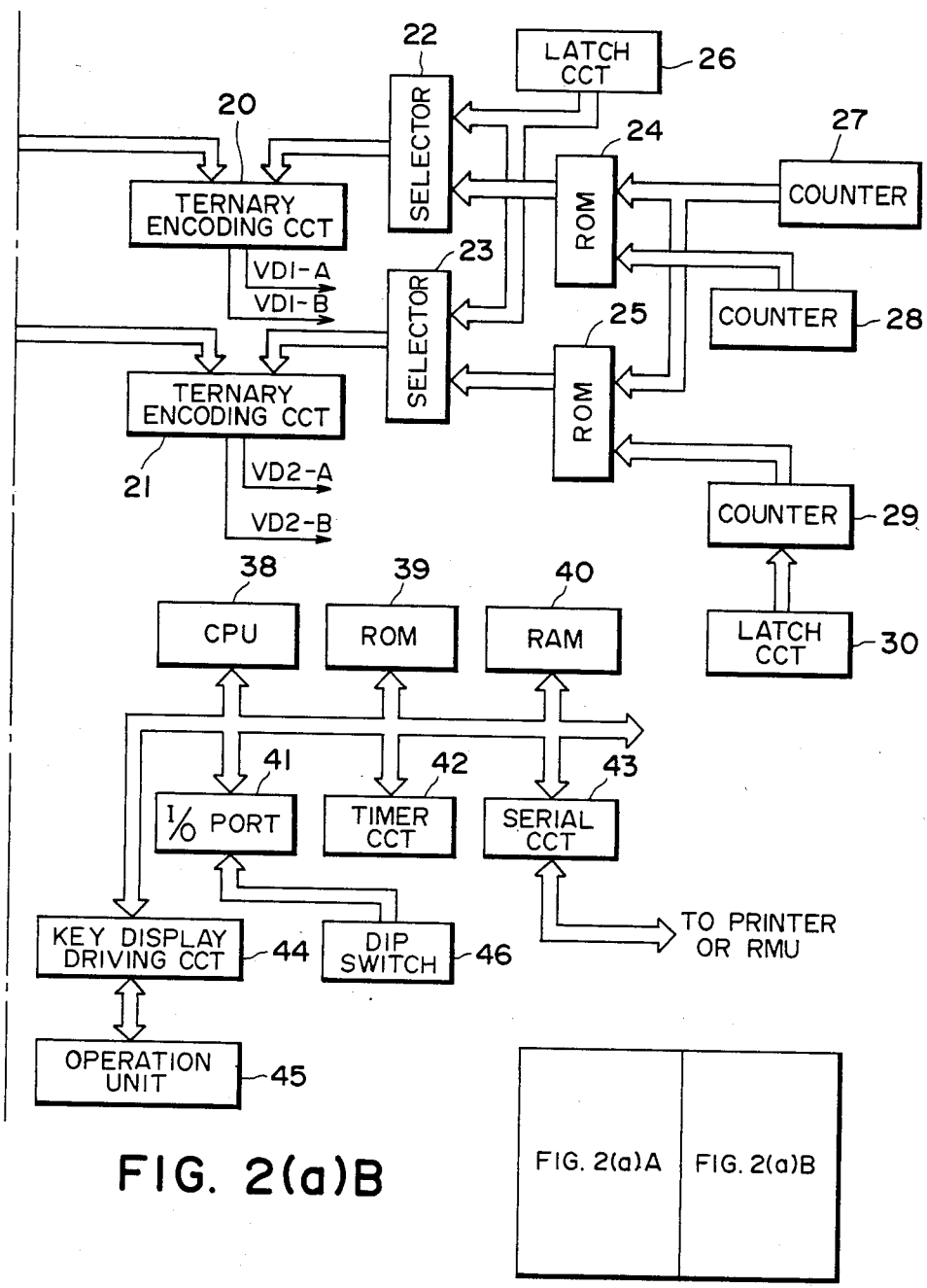
Figure 2B:
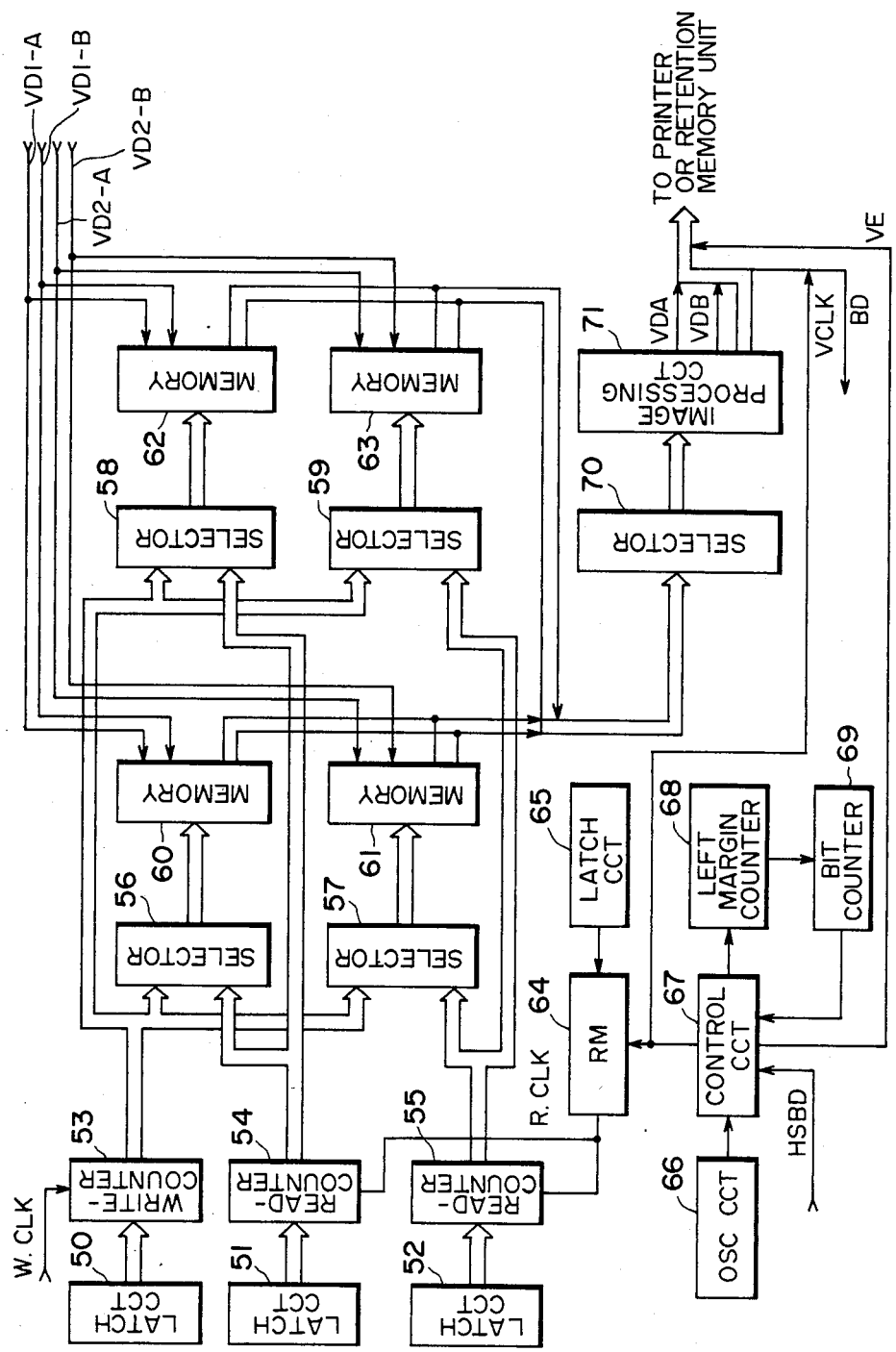
Figure 5:
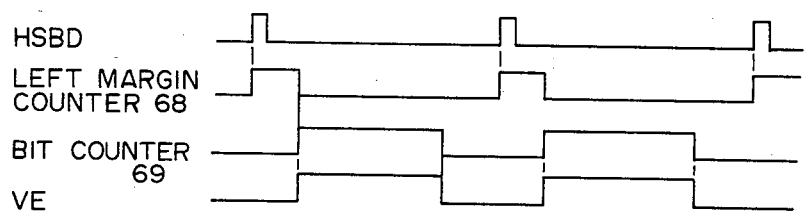
Figure 6:
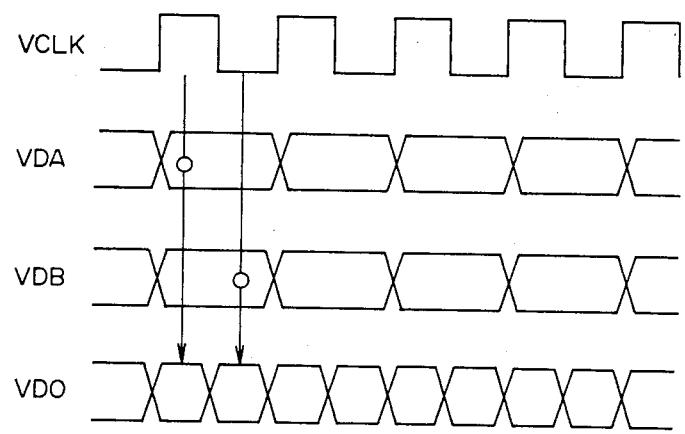
Figure 7:
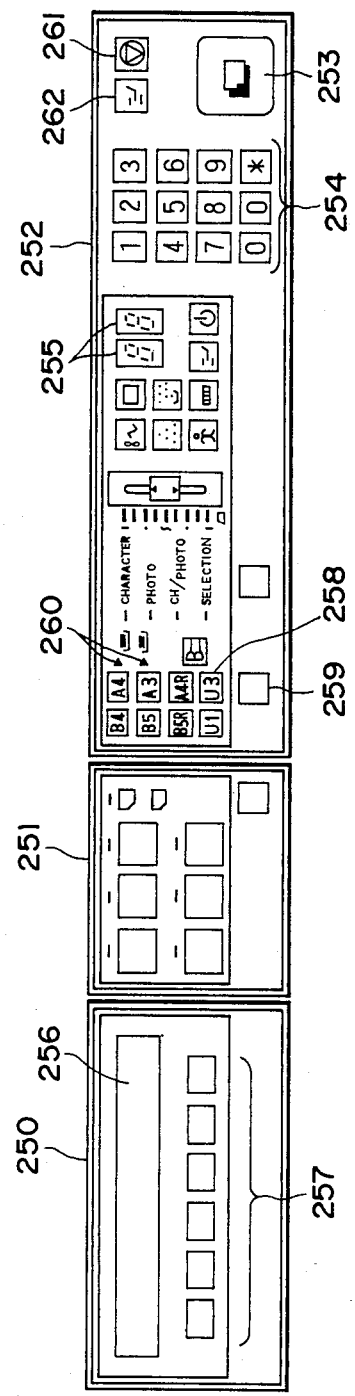
Figure 8:
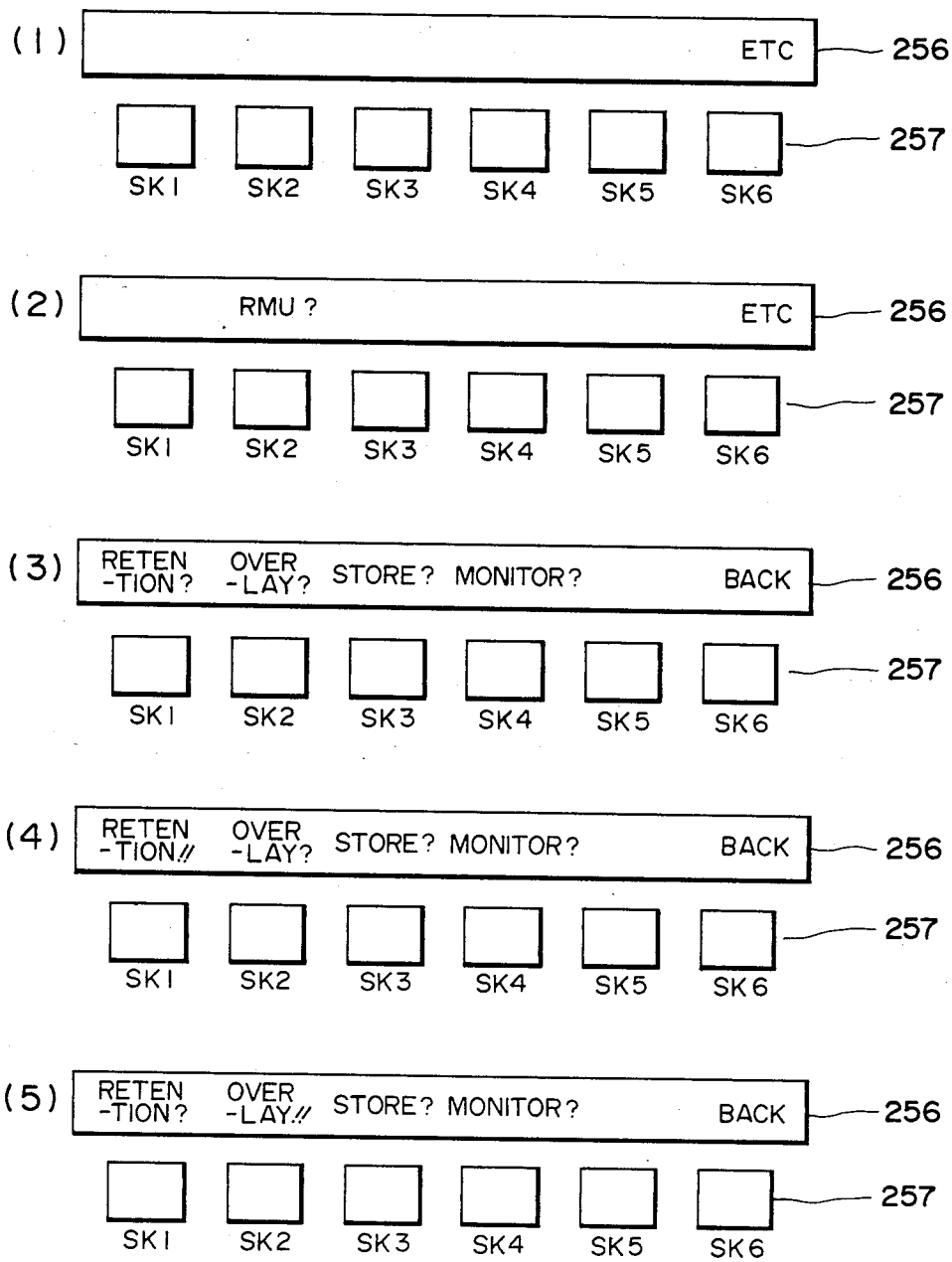
Figure 8:
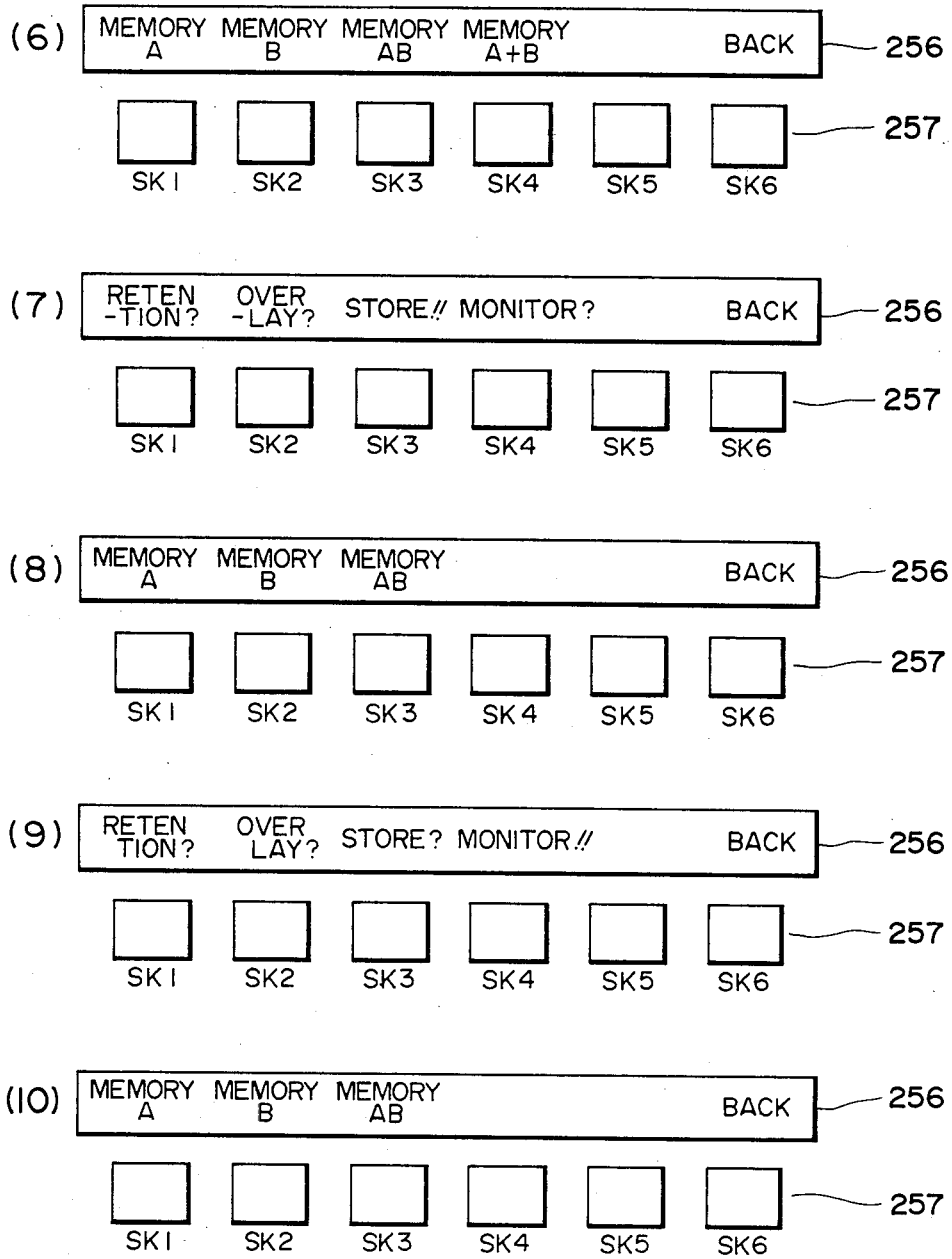
Figure 9:
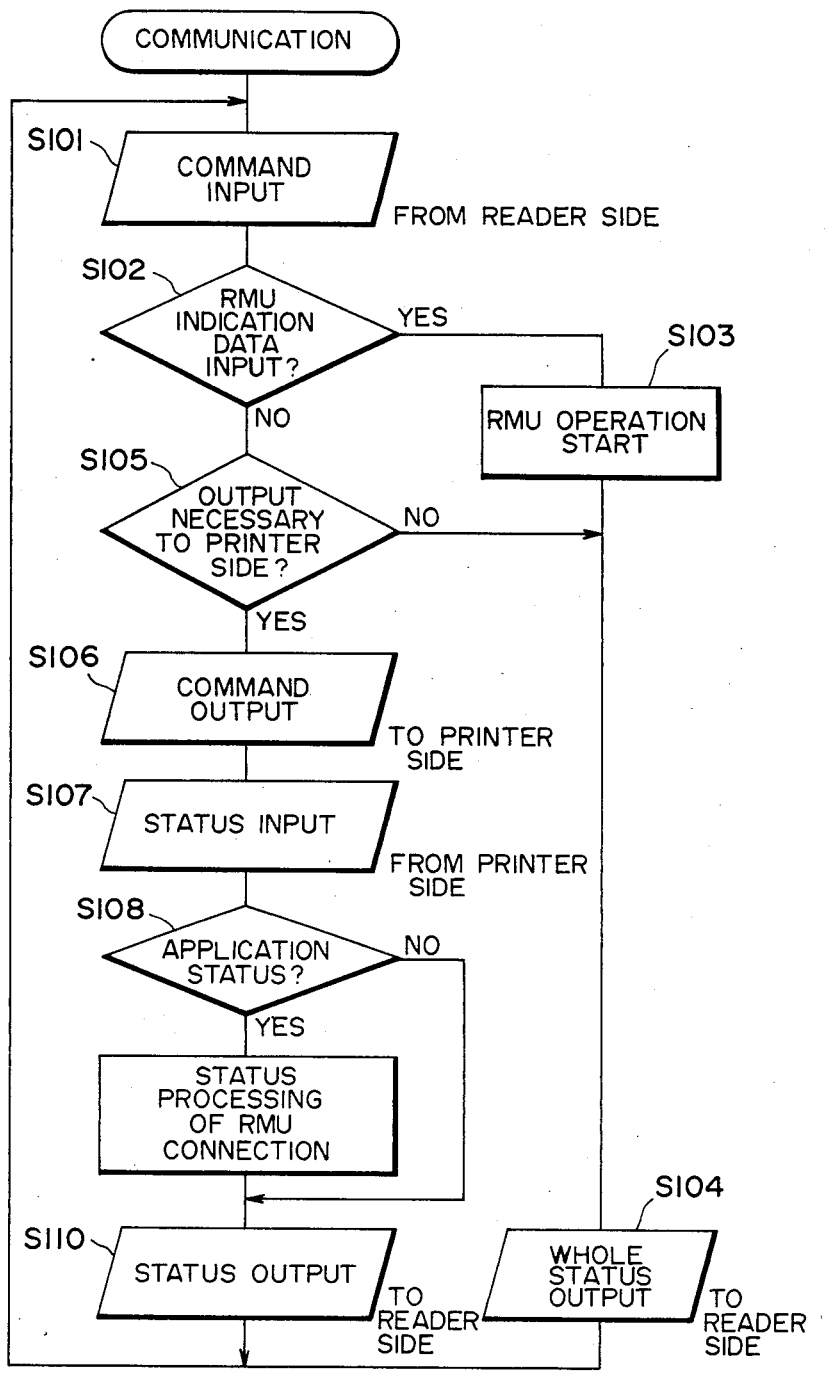
Figure 10:
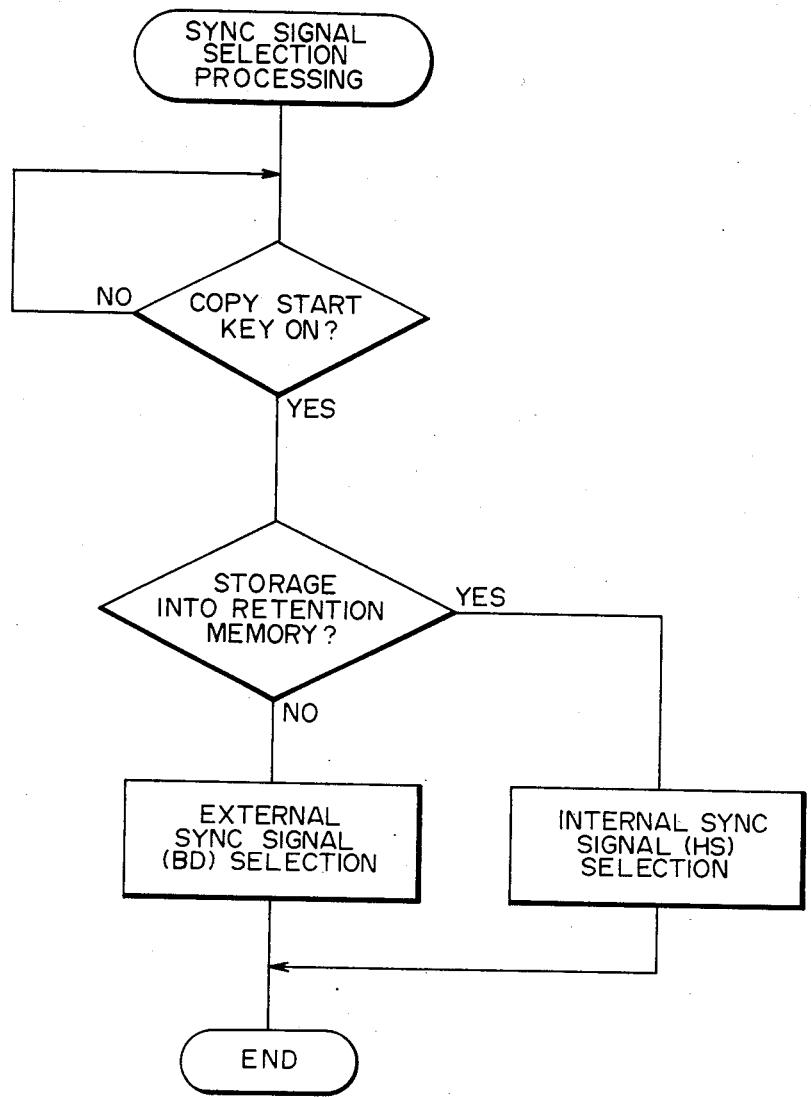
Figure 11:
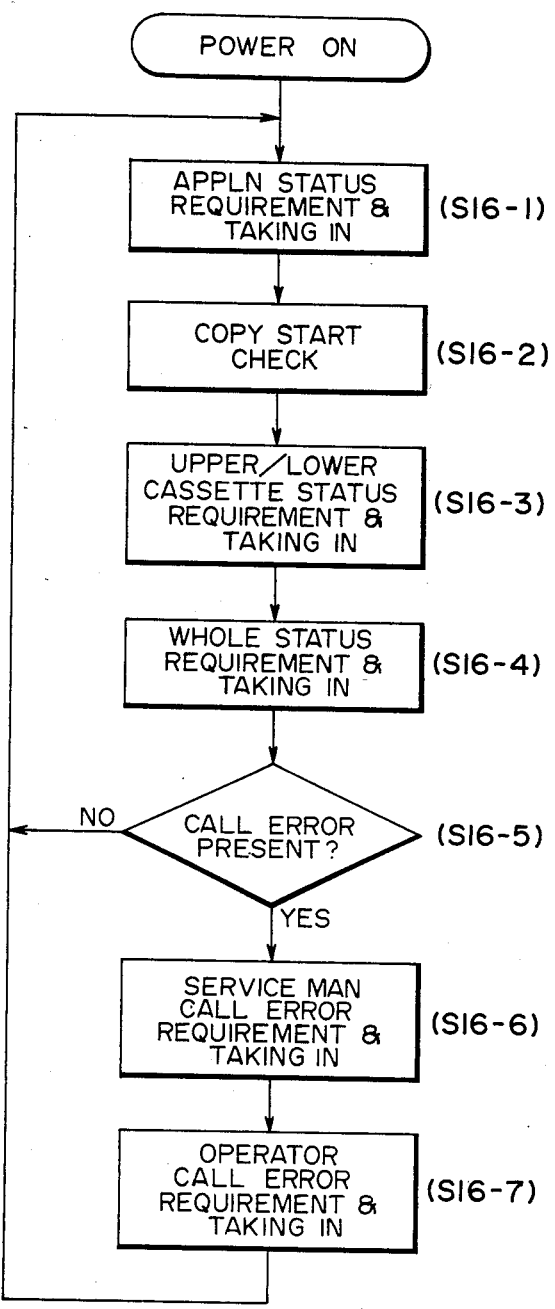
Figure 12A:
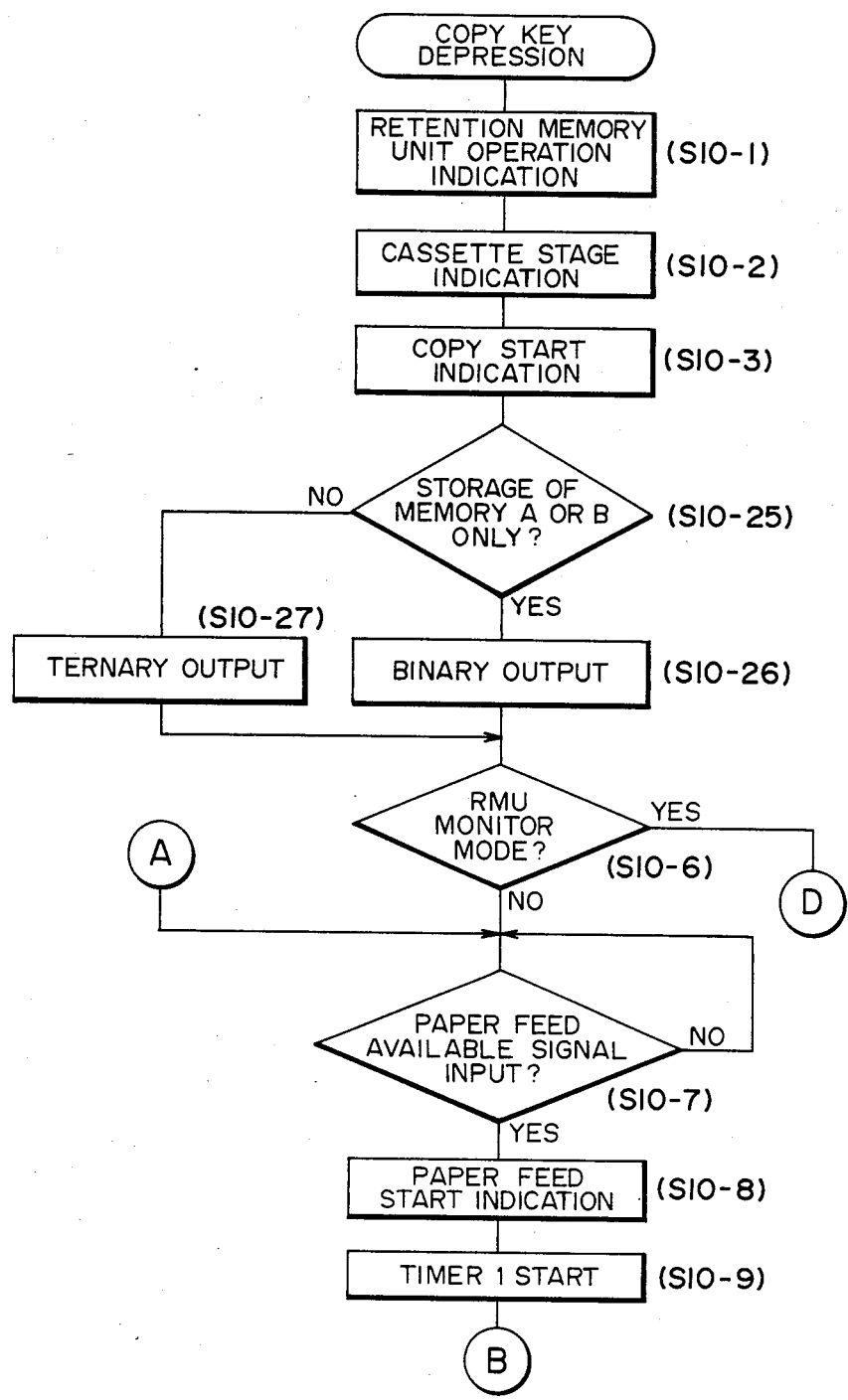
Figure 12B:
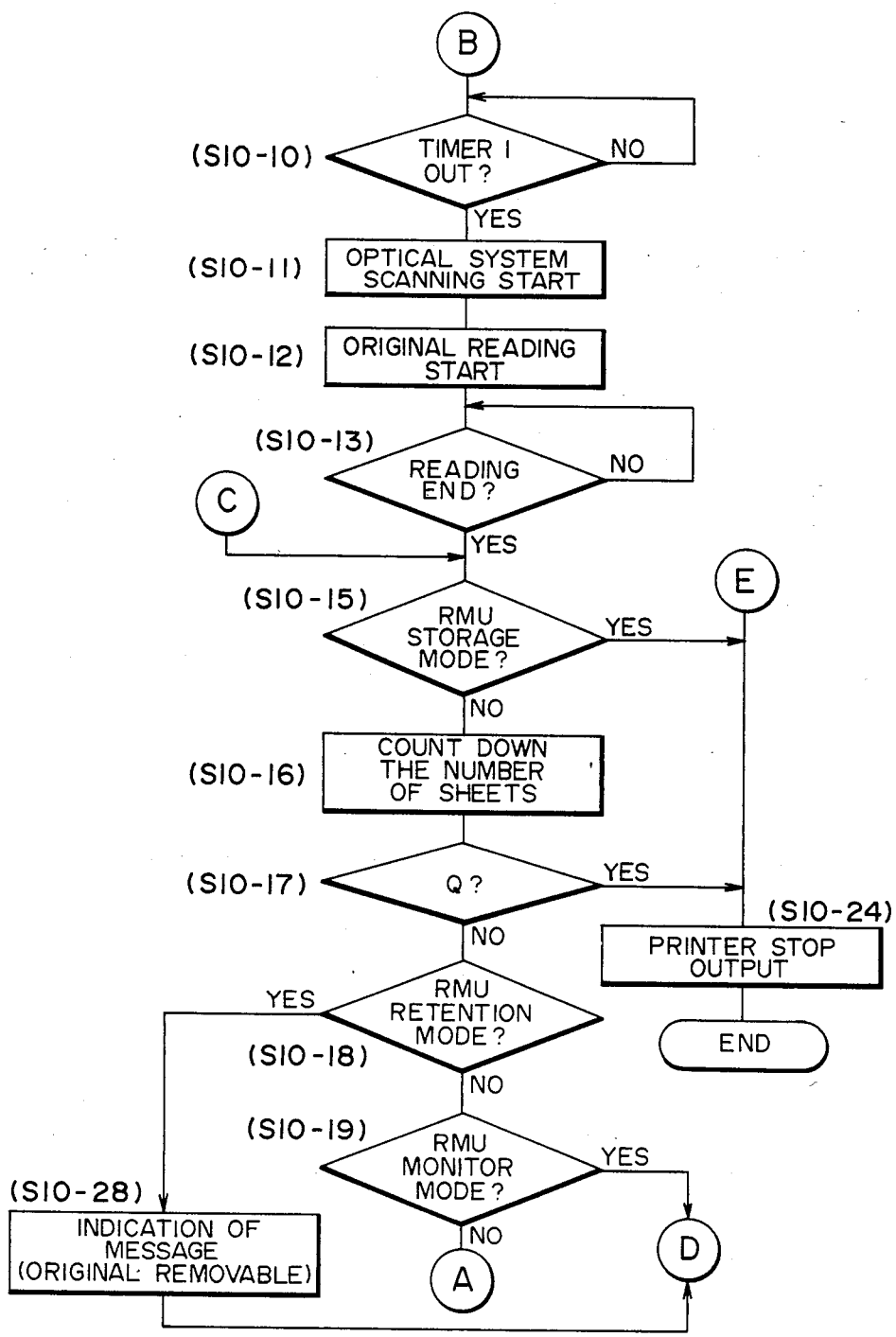
Figure 12C:
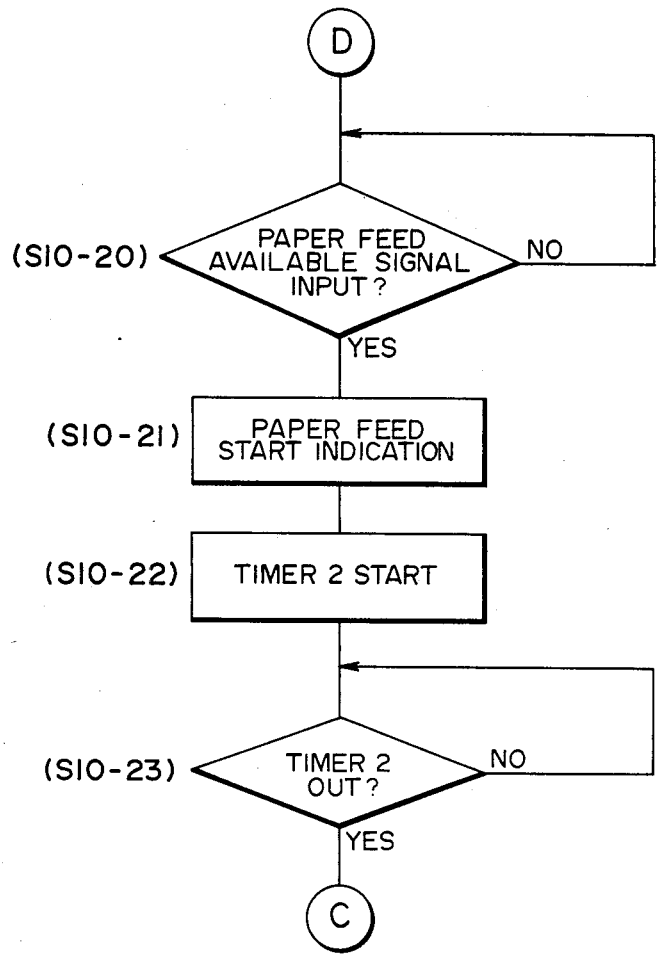
Figure 14A:
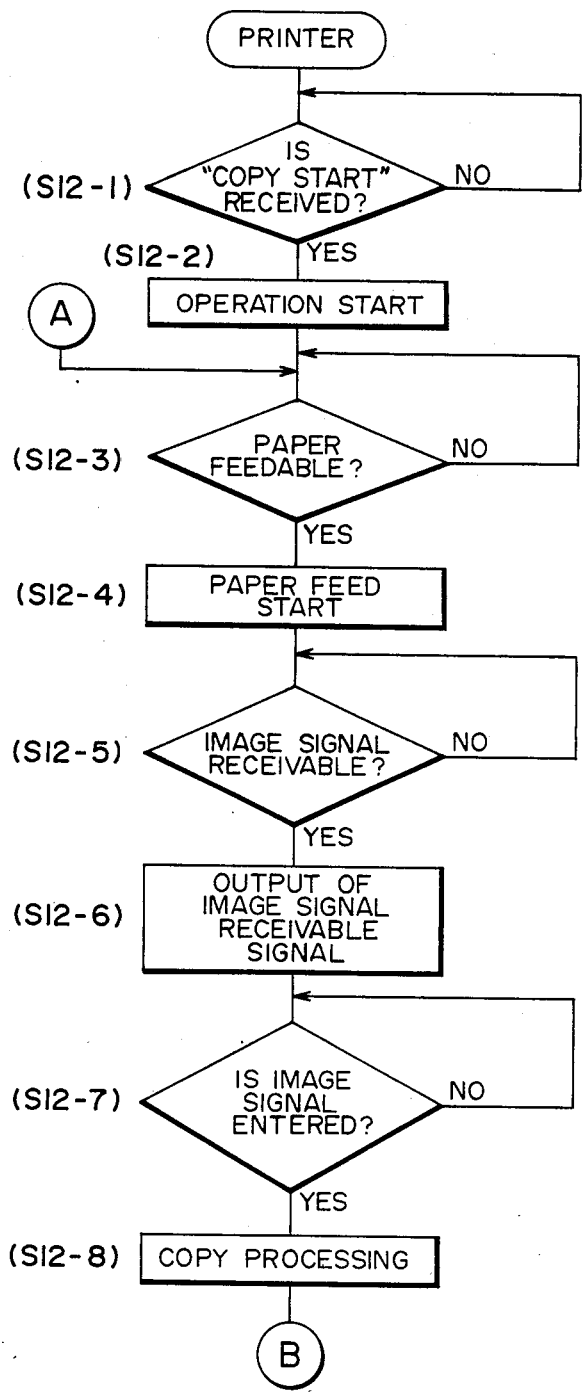
Figure 14B:
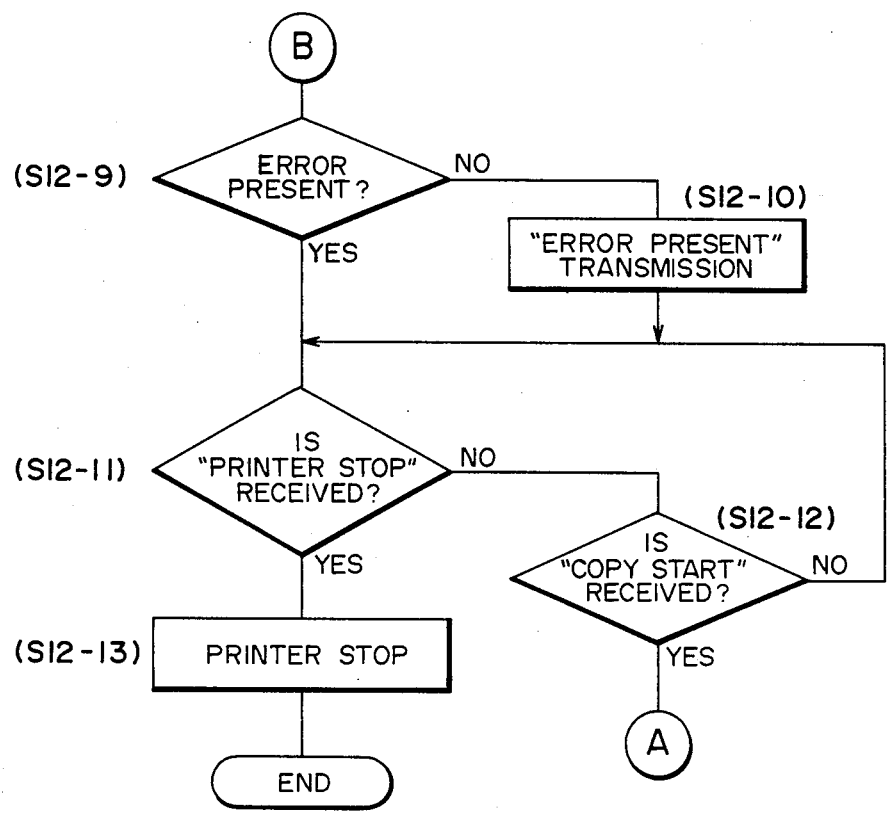
Figure 15A:
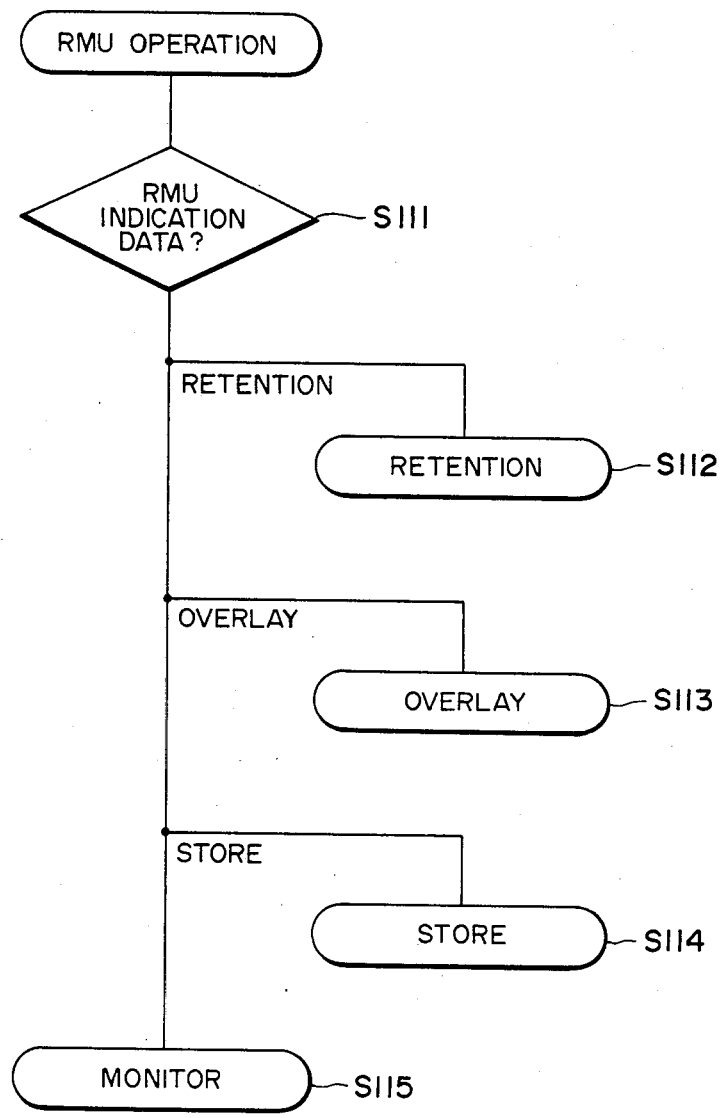

FIG. 5. is a timing chart of signals generated in the image processing system;

FIG. 6 is a timing chart for explaining mixing of two different signals;

FIG. 7 is a front view of an operation unit of the reader shown in FIGS. 2(a) and 2(b);

FIGS. 8(1) to 8(10) are front views of the operation unit for displaying different display states;

FIG. 9 is a flow chart for explaining communication of the RMU;

FIG. 10 is a flow chart for explaining timing signal selection of the reader;

FIG. 11 is a flow chart for explaining communication of the reader;

FIGS. 12A, 12B and 12C are flow charts for explaining image reading in the reader;

FIGS. 13-1, 13-2 and 13-3 show various messages;

FIGS. 14A and 14B are flow charts for explaining the operation procedures of a printer; and FIGS. 15(a) to 15(f) composed of FIGS. 15(f)A and 15(f)B, are flow charts for explaining RMU operations in different modes.

BRIEF DESCRIPTION OF THE PREFERRED EMBODIMENT

The present invention will be described in detail with reference to the preferred embodiment.

Figure 1:
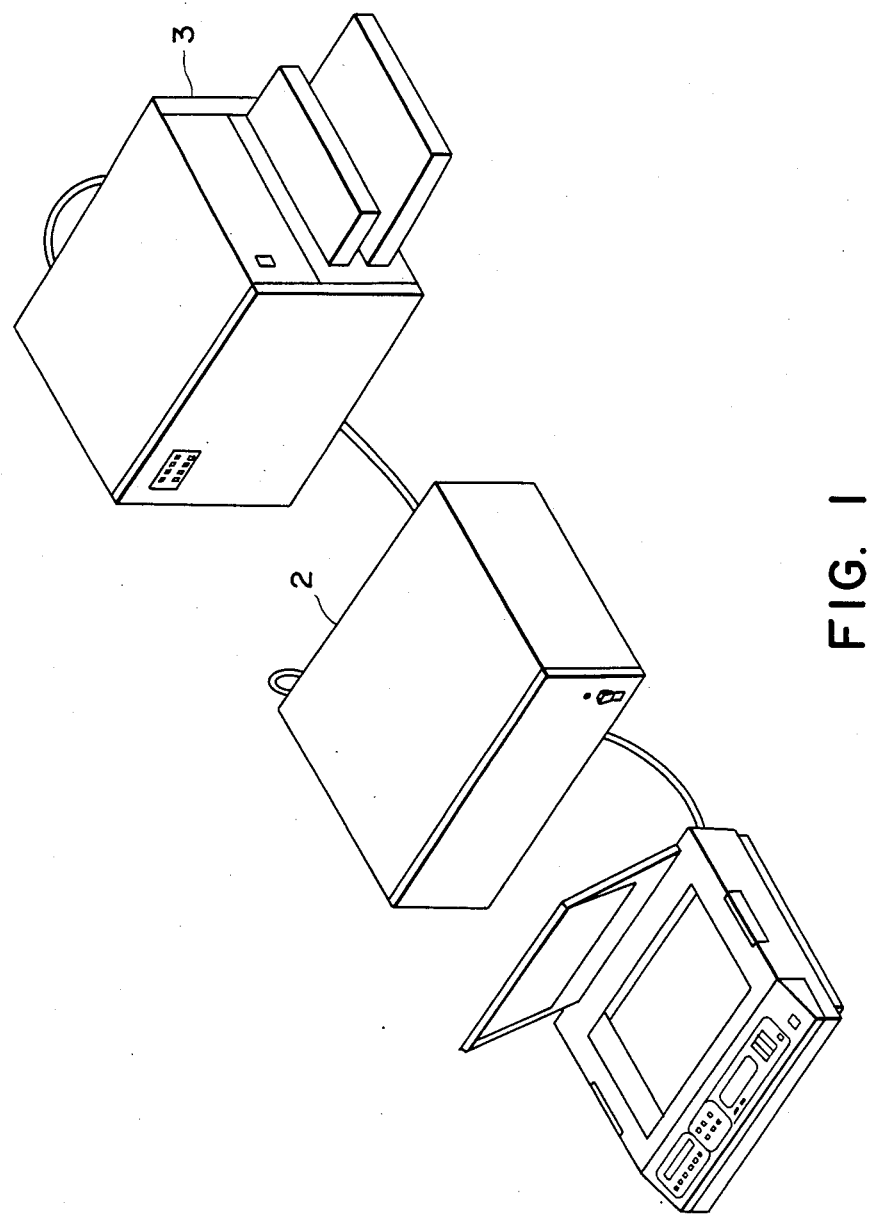

FIG. 1 is a perspective view showing the outer appearance of an image processing system according to an embodiment of the present invention. A reader 1 has image sensors such as CCDs for reading an image on an original. A signal line of the reader 1 is connected to an image data memory (retention memory unit or RMU) 2. The RMU 2 stores electrically converted image data. A signal line from the RMU 2 is connected to a printer 3 for printing an image on a recording medium such as paper.

The detailed internal arrangement of the reader 1, the RMU 2 and the printer 3 will be described with reference to FIGS. 2 t 6. In this embodiment, in order to achieve high-speed, high-density reading, two CCDs are used to read the original image. Signals from the two CCDs are mixed as a one-line signal.

Referring to FIG. 2(a), optical lenses 10 and 11 are used to focus an image 9 of an original on an original table (not shown) onto CCDs 12 and 13. The original image is sequentially scanned with an optical system (not shown). Scanning is performed by a known technique, and a detailed description thereof will be omitted.

The CCDs 12 and 13 convert an original image to electrical signals in accordance with image density. The electrical signals are amplified by amplifiers 14 and 15 and converted by analog-to-digital converter (A/D converters) 16 and 17 to multi-value digital signals representing image densities in units of pixels.

The digital signals are supplied to shading correction circuits 18 and 19. Shading of the digital signals caused by emission variations in the light source, luminous intensity variations in the optical system and sensitivity variations in the CCDs is eliminated by the shading correction circuits 18 and 19. The digital signals are then supplied to ternary encoding circuits 20 and 21 and converted to ternary digital image signals VD1-A and VD1-B and ternary digital image signals VD2-A and VD2-B, respectively. Ternary encoding is performed such that input digital signals are digitized with two different binary levels for ternary encoding. Two ternary processing schemes are utilized: one uses a predetermined binary level given by a latch circuit 26; and the other uses a binary level periodically changed within predetermined matrix sizes stored in dither ROMs 24 and 25. These two schemes are selected by selectors 22 and 23. The dither method is widely used in facsimile systems to represent psuedo-halftones with a binary signal. It should be noted that the binary image signal is generated in place of the ternary image output. In this case, proper binary threshold values are supplied from the latch circuit 26 or the dither ROMs 24 and 25.

In this embodiment, the predetermined binary levels are given for the character original, while the dither method is used for halftone images such as a photograph, so that optimal images can be obtained. The two different binary levels for ternary encoding can also have the same level.

Dither patterns are sequentially read out from the dither ROMs 24 and 25 in response to address signals from a counter 27 for counting the number of subscanning lines and counters 28 and 29 for counting the number of pixels along the main scanning direction. In order to prevent disturbance at a boundary of a mixed dither pattern when the electrical signals read by the CCDs 12 and 13 are mixed, a latch circuit 30 is connected to a counter 29 to supply optimal count preset data thereto.

The latch circuit 30 and other latch circuits in FIG. 2(a) are connected to a CPU bus of a CPU 38 so that data is latched under the control of the CPU 38. The CPU 38 is operated by a control program prestored in the ROM 39 and controls overall operation with a RAM 40, an I/O port 41, a timer circuit 42, a serial circuit 43, and a key display driving circuit 44.

The CPU 38 performs adjustment and operation verification using a value preset by a DIP switch 46.

The key display driving circuit 44 scans the key matrix in the operation unit 45 and drives a display such as an LED. The serial circuit 43 supplies control instructions to the printer and the RMU and receives information.

An oscillator 32 supplies timing clocks to a CCD driving circuit 31 for driving the CCD 12 and 13 and to any other sections for processing the image signal. Oscillation clocks are counted by a counter 33, and a count is supplied to a decoder 34, thereby generating various timing clocks.

The decoder 34 generates an internal sync signal HS for ever subscanning line. The internal sync signal HS is supplied to a selector 35. The selector 35 also receives a sync signal BD signal (to be described later) from the printer when the printer is connected to the reader. The CPU 38 automatically selects the signal BD when the printer is directly connected to the reader and the signal HS when the RMU is connected to the reader in accordance with the steps in the flow chart of FIG. 10. The selected signal is supplied as a signal HSBD which serves as a subscanning sync signal. The signal HSBD is also supplied to the counter 33 and used as a count reset signal.

The counter 33 generates original clocks for writing image signals VD1 and VD2 in memories 60 to 63. The original clock serves as a memory write clock signal WCLK through a rate multiplier 36. The rate multiplier 36 divides the frequency of the input clock signal in response to an external control signal (supplied from the latch circuit 37 in this embodiment). The signal WCLK is used for variable mutiplication of the image along the main scanning direction.

Referring to FIG. 2(b), latch circuits 50, 51 and 52 supply preset data to a write counter 53 and read counters 54 and 55. The write counter 53 generates an address signal in response to the signal WCLK from the rate multiplier 36 in FIG. 2(a). This address signal is used to write the signals VD1-A, VD1-B, VD2-A and VD2-B in the memories 60 to 63. The read counters 54 and 55 generate read address signals in response to a signal RCLK (to be described later). The read address signals are supplied to the memories 60 to 63 to read out the written image signals VD1 and VD2 therefrom.

The address signals from the write counter 53 and the read counters 54 and 55 are supplied to selectors 56 to 59. The selectors 56 to 59 select the write address signal from the write counter 53 or one of the read address signals from the read counters 54 to 55, and the selected signal is supplied to the memories 60 to 63.

The memories 60 to 63 are grouped in one pair of memories 60 and 61 and another pair of memories 62 and 63. While one pair is set in the write access mode, the other pair is set in the read access mode, thereby converting the signal speed.

Each pair of memories repeats write and read operations. In the write mode, the memories receive the write address signal from the write counter 53 through the selectors 56 to 59. However, in the read mode, the memories receive the read address signal from one of the read counters 54 and 55 through the selectors 56 to 59. The repetition of the read and write operations is controlled by the signal HSBD.

The signals VD1-A, VD1-B, VD2-A and VD2-B read out from the memories 60 to 63 are supplied to a selector 70 which then generates a one-line image signal. This signal is then supplied to an image processing circuit 71 and is subjected to editing such as image inversion and trimming, so that the ternary or binary image signals VDA and VDB are supplied to the printer or the RMU.

An oscillator 66 generates an oscillated signal as a read reference timing signal. The oscillated signal is supplied as a common sync signal or as a video clock (VCLK) for the image signals VDA and VDB to the printer or the like. A control circuit 67 controls the write operation in response to the signal HSBD. More specifically, the control circuit 67 controls a left margin counter 68 and a bit counter 69.

A rate multiplier 64 and a latch circuit 65 generate a read clock RCLK in the same manner as the rate multiplier 36 and the latch circuit 37. A video enable signal VE is supplied from the control circuit 67 to the printer or the like.

The control circuit of the RM 2 will be described with reference to FIGS. 3A and 3B. The RMU 2 consists mainly of a memory section and a control section. A microcomputer 75 in the control section is connected to a ROM 76, a RAM 77, an I/O port 78, a timer circuit 79 and a serial communication circuit 80 via a CPU bus. The operations of these components are the same as those of the reader. The I/O port 78 is connected to each selector in the memory section. The serial communication circuit 80 can be connected in parallel with the reader and the printer.

The memory section consists of memories A 85 and B 86, each of which has a dynamic RAM for storing one-page data of an A3 size sheet of paper. Alternatively, compressed image data can be stored in the memories A 85 and B 86. Selectors 97 and 98 are connected to input lines of the memories A 85 and B 6. An image signal generated as a ternary signal consisting of two different video signals VD-A and VD-B is written in the corresponding memory. An image signal generated as a binary signal is written in one or both of the memories A and B. The image signal selected by the selector 97 is written in a shift register 1A (82) in synchronism with the video clock VCLK and then in the memory A (85) in synchronism with the address signal from an address generator 83. Similarly, the image signal selected by the selector 98 is written in the memory B (86) through a shift register 1B (84). Two different image signals are thus written in response to the common video clock VCLK. The address generator 83 for addressing the memories is synchronized with a video clock VCKS and a video enable signal VES and addresses both the memories A and B.

The video clock VCKS supplied to the address generator 83 is the clock VCLK from a selector 81 for selecting either the clock VLCK externally supplied together with the image signal, or a clock ICLK generated by an internal clock generator 91. The video enable signal VES supplied to the address generator 83 is the signal VE from the selector 88 for selecting either the signal VE externally (e.g., from the reader) supplied together with the image signal, or a signal IVE generated by a video enable signal generator 87. The address generator 83 is used to read the image data from the memories A and B. It should be noted that the write and read access data from the memories A and B is output from the I/O port 78 under the control of the CPU 75.

Image data from the memories A and B (85 and 86) is read in response to the address signal from the address generator 83 and is stored in shift registers 2A and 2B (89 and 90). The data from the shift registers 2A and 2B is read out as serial data in response to the common video clock ICLK from the internal clock generator 91. In this case, the selector 81 selects the internal clock ICLK as the video clock VCKS. The video enable signal generator 87 consists of the same circuit as the HSBD generator in the reader and is operated at the timing shown in FIG. 5.

The serial image signals from the memories A and B through the shift registers 2A and 2B are selected by selectors 92 and 93 for selecting one of image signal lines A and B. An output from the selector 92 or 93 and the through image data bypassing the memories and gated through a through-gate 99 are ORed by OFF circuits 94 and 95, and the result is output. Gate circuits 72, 73, 100, and 101 are operated to OR the outputs from the memories A and B and the through image signal. Either the externally supplied clock signal VCLK or the clock ICLK from the internal clock generator 91 is selected by a selector 96 in accordance with the operation mode, so that the selection video clock is supplied to the subsequent stage.

As described above, the RMU unit has memories the number of which is equal to the number of multi-value signal buses of which each is constituted by a plurality of signal lines. Data is independently written in each memory. For example, if a monochromatic binary data signal which does not require ternary notation is to be stored in the memory, one of the memories can be used.

In this case, the ternary image one-page memory can be used as a binary image two-page memory, and thus the application of memory units can be widened.

The image processing system has a plurality of image data memories for storing two different binary data constituting the ternary data, and the output from the memory section can be output to any one of the plurality of signal lines. For example, when the signal is sent on half the number of the ternary signal lines and the signal lines for sending the signals from the original can overlap, a reproduced image with a vague frame can be obtained, thus increasing image reproduction capacity.

In a system for sending an image signal as multi-value data through a plurality of signal lines, different types of signals can be sent in response to a common image data sync signal. In this case, the I/O circuit of the image data can be simplified and the number of signal lines can be decreased, resulting in lower costs.

The RMU has memory units, the number of which is equal to the number of image data signal lines. These memory units are read/write accessed by a common address generator, so that a simple circuit can control a plurality of memory units.

The RMU can mix the image signal from the reader and the image data stored in the RMU, so that image reproduction can be performed at high speed and image control function can be improved.

The RMU is operated in synchronism with the printer in the write mode and in synchronism with the reader in the read mode. In the write mode, the reader can be operated with the printer and the RMU synchronized with each other. I the image reproduction mode, the printer is operated with the reader and the RMU synchronized with each other. System design can be simplified and the system configuration can also be easily determined.

Figure 4:
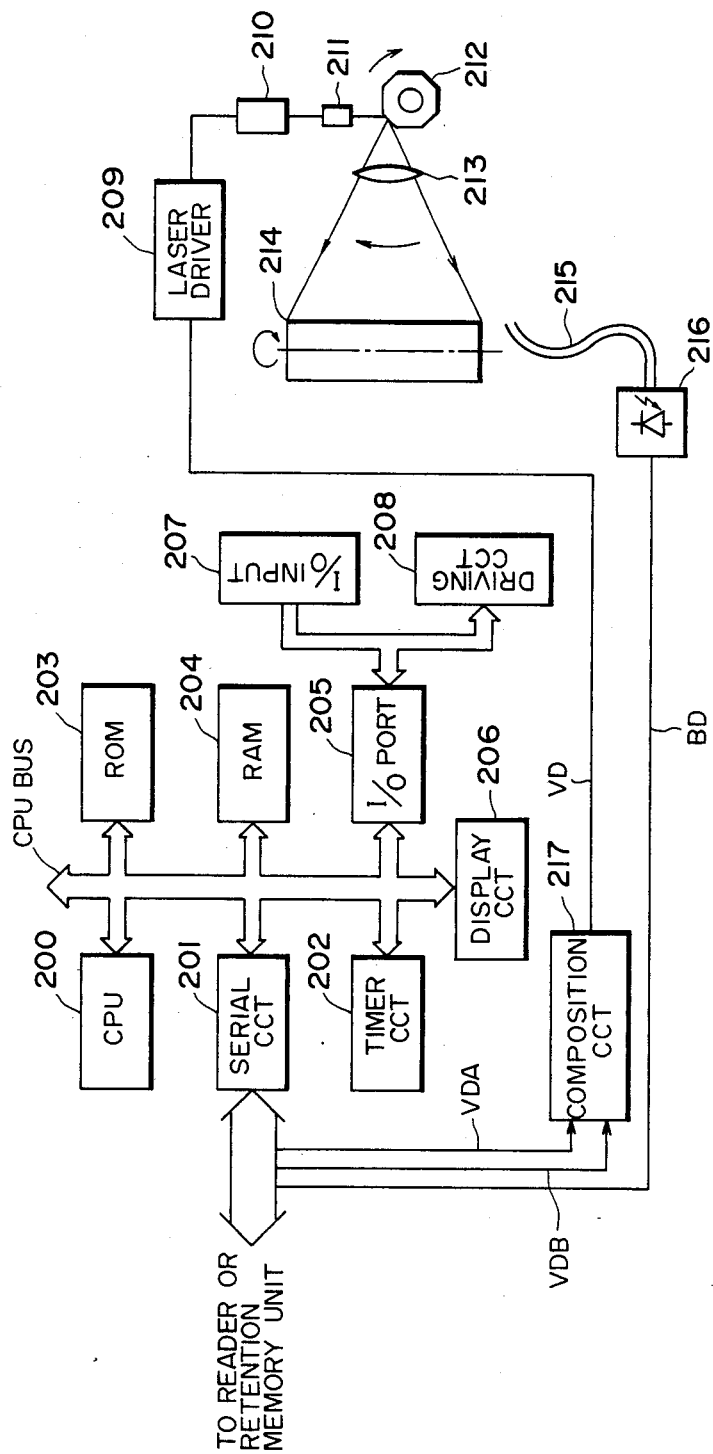
FIG. 4 is a block diagram showing the internal arrangement of a printer.

FIG. 4 is a block diagram showing the internal arrangement of the printer. Referring to FIG. 4, the printer is connected to the reader directly or through the retention memory unit.

A serial signal line from the reader or retention memory unit is connected to a serial circuit 201, so that a serial signal therethrough can be processed under the control of a CPU 200. The CPU 200 is operated by a control program prestored in a ROM 203 and controls the overall operation of the printer with a RAM 204, a timer circuit 202 and an I/O port 205.

An input interface 207 performs input processing for sensor signals from a paper sensor in the printer. A driving circuit 208 drives a motor (not shown), a high-voltage transformer and the like. A display circuit 206 is used to indicate out-of paper, paper jam and printer status.

Signals (image signals) VD and VDB from the reader or the RMU are supplied to a composition circuit 217 and are mixed as a ternary signal (the signal VD). The ternary signal is supplied to a laser driver 209, and a semiconductor laser 210 emits a laser beam in response to the signal VD. The laser beam is collimated by a collimator lens 211 and is scanned by a polygonal mirror 212 which is rotated in a predetermined manner, so that the laser beam is substantially parallel to the rotating shaft of a photosensitive drum 214. The intensity of the scanned laser beam is corrected by an f-$\theta$ lens 213, and the photosensitive drum 214 is irradiated with the corrected laser beam corresponding to the signal VD.

The image is formed in the printer in accordance with an electrostatic recording scheme. Unnecessary charge applied to the photosensitive drum 214 is removed with the laser beam, and the latent image is developed with a developing agent. The developed image is transferred to a printing sheet and is then fixed. The electrostatic recording scheme is a known method, and a detailed description thereof will be omitted.

The laser beam scanned by the polygonal mirror 212 is incident on an optical fiber 215 before the photosensitive drum 214 is irradiated therewith. When a photosensor 216 detects the incident laser beam, it generates an electrical signal (the signal BD). As is apparent from FIG. 4, when the signal VE is generated after the signal BD and the laser beam reaches the photosensitive drum 214, the latent image is formed at a proper position on the photosensitive drum 214.

The output timing of the signal VD is shown in detail in the timing chart of FIG. 5.

FIG. 5 exemplifies a case wherein the printer is connected to the reader. However, even if the printer is connected to the RMU, the same operation can be performed in the same manner.

Referring to FIG. 2(b), the left margin counter 68 is started upon generation of the signal HSBD in response to the signal BD. When the left margin counter 68 reaches a predetermined time, the bit counter 69 is started. The memories 60 and 61 or the memories 62 and 63 start to output the signal VD. The bit counter 69 stops after it causes the control circuit 67 to continuously generate the signal VD for the image formation duration of the photosensitive drum 214, and then waits for the next signal BD generated in response to the signal HSBD.

The signal VE is a duration signal representing the operating duration of the bit counter 69.

FIG. 6 shows a timing chart of the image signals in the image signal composition circuit 217 shown in FIG. 4. The image signals VDA and VDB are supplied to the composition circuit 217 in response to the video clocks (VCLK). The composition circuit 217 alternately selects the image signals VDA and VDB at a frequency twice that of the video clock signal. The image signals VDA and VDB are mixed to form an output VDO.

FIG. 7 shows an operation unit arranged in the reader connected to the image processing system in this embodiment. The operation unit has a standard operation section 252, a preset operation section 251, and a special operation section 250 with a liquid crystal display 256 and soft keys 257. The standard operation section 252 has a print number setting ten-key pad 254, a print number setting display 255, a copy start key 253, and so on. The operation procedures of these keys are the same as in a conventional copying machine.

The special operation section 250 allows a user to create an arbitrary copy mode and has the six soft keys 257 and the liquid crystal display 256 for displaying label contents corresponding to the soft keys 257, the copy mode, data and various messages. When the user wishes to select one of the display contents in the liquid crystal display 256, he depresses the corresponding soft key to create a copy mode or the like.

The preset operation section 251 registers a copy mode (conditions) preset by the standard operation section 252 and the special operation section 250. A complicated copy mode can be registered in the RAM 40 and can be set by pressing a single key without using the special operation section 250, thereby allowing easy selection of a desired mode.

The printer, the reader and the RMU can be connected in the following two ways: the first is to connect the reader to the printer through the RMU; and the second is to connect the printer to only the reader. The connection status is determined by application status (to be described later).

Figure 3A:
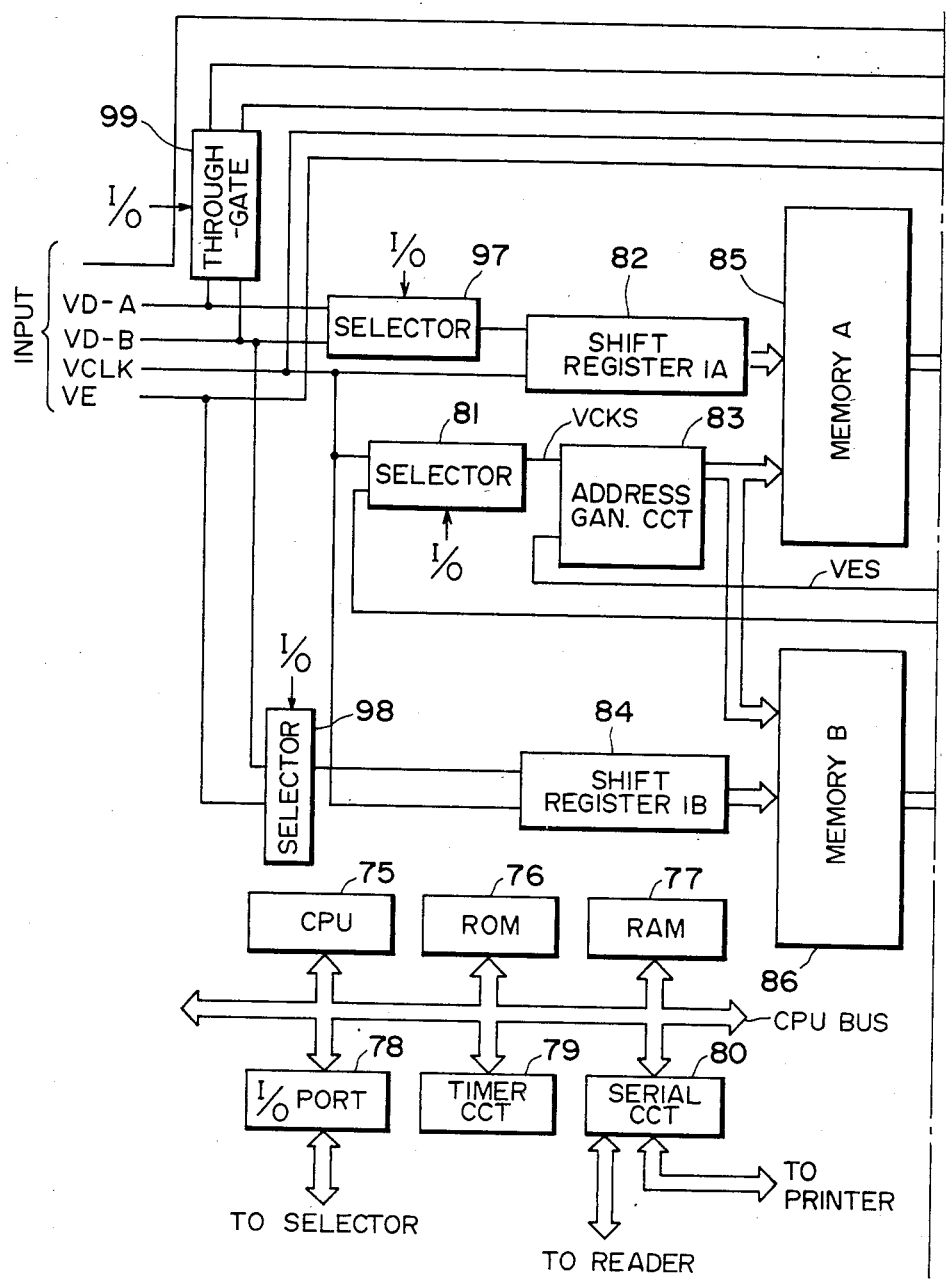
FIGS. 3A and 3B are block diagrams showing the internal arrangement of a retention memory unit (RMU)
Figure 3B:
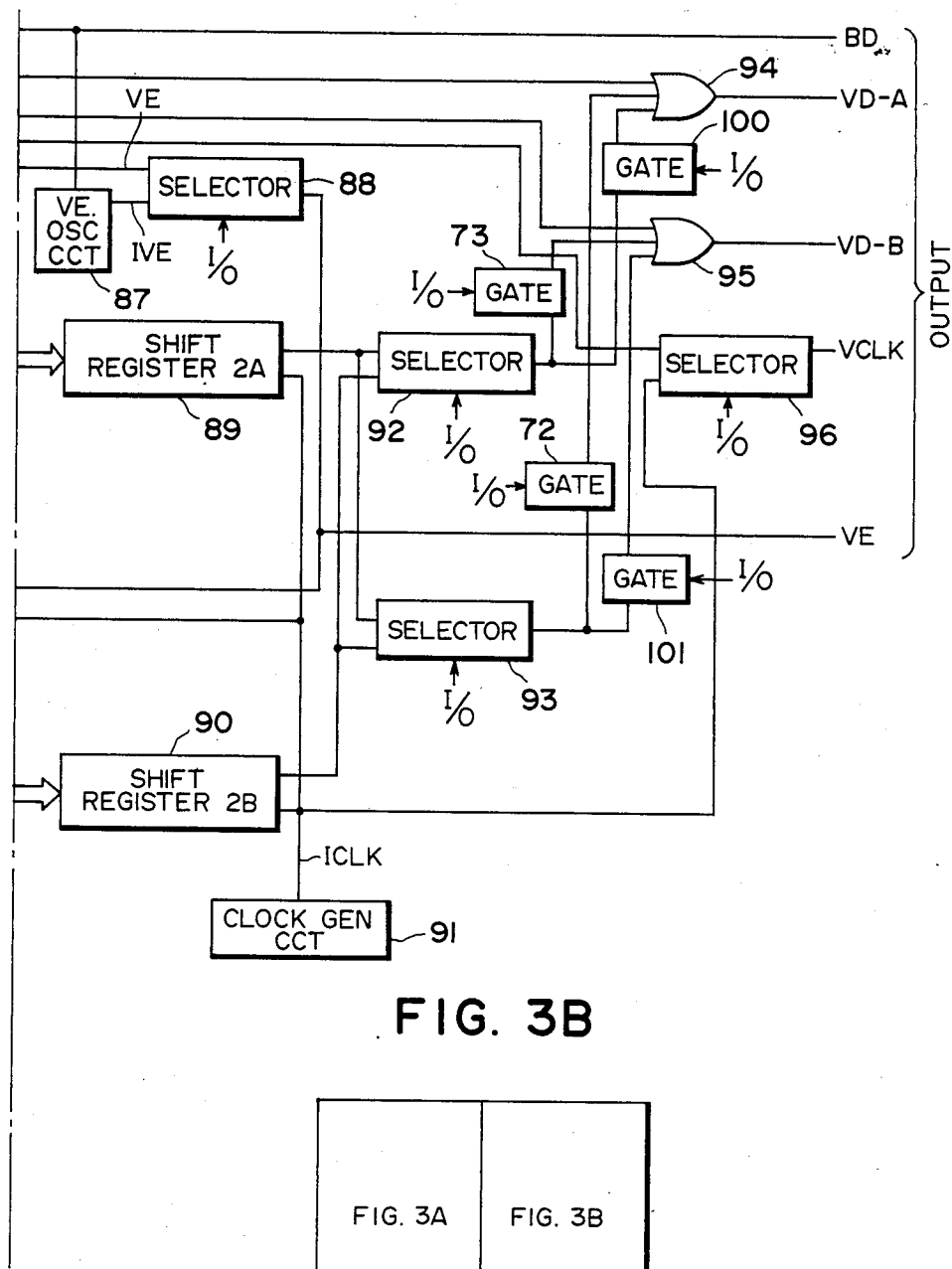

The first method, using the RMU, is shown in FIGS. 3A and 3B and includes four operation modes: (1) a retention mode wherein the image signal from the reader is stored in the RMU and at the same time the first page is printed at the printer, and image reproduction of the second and subsequent sheets is performed in accordance with the output from the RMU, thereby obtaining a plurality of copies; (2) an overlay mode wherein the prestored image data is mixed with the output signal from the reader and the mixed signal is reproduced at the printer; (3) a store mode for only storing the image signals from the reader to the RMU; and (4) a monitor mode wherein the image data already stored in the RMU is output and is reproduced at the printer. These modes can be specified at the reader. In any mode, the RMU is operated in response to an instruction from the reader.

RMU mode setting on the special operation unit 250 in the reader will be described with reference to FIG. 8. Referring to FIG. 8, the operation unit 250 has the liquid crystal display 256 and the six soft keys 257 (to be referred to as SKs or SK1 to SK6 hereinafter). The contents corresponding to the soft keys SK1 to SK6 are displayed on the liquid crystal display 256.

Upon energization of the image processing system in this embodiment, ETC (etc.) is displayed at the portion of the liquid crystal display 256 which corresponds to the key SK6. Every time the user depresses the key SK6, the contents of the display 256 which correspond to the keys SK1 to SK5 are sequentially changed in a loop, so that the user can change and/or select the input mode in accordance with the system configuration.

More particularly, the reader detects which components are connected to the system in accordance with signals from the printer, so that the input mode corresponding to the system configuration is selected by the user.

When the RMU is connected to the system, the selection state of the RMU input mode is displayed upon depression of the key SK6 corresponding to "ETC", as shown in FIG. 8(2). In this state, when the user depresses the key SK2 corresponding to "RMU?", the RMU mode is selected (when the user does not wish to select the RMU mode, another input mode is set while the content of the liquid crystal display 256 is changed upon depression of the key SK6 corresponding to "ETC"). If the RMU is not connected to the system, the display in FIG. 8(2) is not given.

When the user depresses the key SK2 while the display 256 is in the state shown in FIG. 8(2), the RMU mode is selected and the display content is changed to the state in FIG. 8(3). The keys SK1 to SK4 correspond to the retention mode (high-speed copying using the memory), the overlay mode (overlay between the memory contents and the original), the store mode (srorage of the original in the memory) and the monitor mode (sweeping from the memory), respectively. When the key SK6 corresponding to "BACK" is depressed, the display content of the display 256 is changed to the state shown in FIG. 8(2), thus restoring the RMU input mode.

In the display state shown in FIG. 8(3), the user selects a desired one of the four modes. For example, when the user depresses the key SK1 corresponding to "retention?", the retention mode is selected. The display content corresponding to the key SK1 is changed to "retention!!" as shown in FIG. 8(4). It should be noted that a question mark "?" indicates that the corresponding mode has not been selected yet, and that a double exclamation mark "!!" indicates that the corresponding mode has been selected upon depression of the corresponding key SK.

When the retention mode is selected, the ten-key pad 254 is used to set the desired number of copies and the start key 253 is depressed to perform a high-speed retention operation (i.e., single original reading and repeated copying of an identical image a plurality of times) using the RMU in the same operation as in conventional copying machines. In this case, the selectors in the retention memory are operated to store different ternary signals VDA and VDB read by the reader in the memories A and B, respectively.

In the RMU input mode, assume that the overlay mode is not selected (i.e., "overlay?" is displayed as shown in FIG. 8(3)). When the user depresses the key SK2 corresponding to "overlay?", the overlay mode is selected. In this state, the display content of the display 256 is changed from that shown in FIG. 8(3) to that shown in FIG. 8(5). Furthermore, the system awaits the next key input for the display state shown in FIG. 8(6).

In this case, the user must select which of the storage contents of the memories A and B is to be overlayed on the original image. The keys SK1 to SK4 correspond to selections of "memory A", "memory B", "memories A, B" and "overlay with memories A+B" (to be described in detail later), respectively. The operator selects a memory (or memories) to be overlayed with the original image upon depression of one of the keys SK1 to SK4. Thereafter, the operator sets the desired number of copies with the ten-key pad 254 and depresses the start key 253. Overlay of the original image being read and the image stored in the RMU is then performed a desired number of times.

In the state wherein the store mode has not been selected in the RMU input mode, when the operator depresses the key SK3 corresponding to "store?" in the same manner as in the retention and overlay modes, the store mode is selected. In this case, the display 256 changes from the state shown in FIG. 8(7) to the state shown in FIG. 8(8) and awaits a key input. This selects the RMU storage location for the image information read by the reader. In this case, the keys SK1 to SK3 correspond to the storage of image information in "memory A", "memory B" and "memories A and B". When the operator depresses the SK key corresponding to the memory in which the image information is to be written, the desired memory is selected. It should be noted that if one of "memory A" and "memory B" is selected, the reader generates the image information as a binary signal. When "memories A and B" is selected, the reader generates image information as a ternary signal. Upon selection of the desired memory (or memories), the operator depresses the start key 253 so that the original image information can be stored therein, thus preparing the overlay and monitor modes.

In the state wherein the monitor mode is not selected in the RMU input mode, when the operator depresses the key SK4 corresponding to "monitor?" in the same manner as described above, the content of the display 256 is changed from the state shown in FIG. 8(9) to the state shown in FIG. 8(10). The image processing system awaits a key input for selecting the RMU memory to be accessed. In this case, the keys SK1 to SK3 correspond to output from "memory A", "memory B" and "memories A and B", respectively. After the operator depresses an SK key corresponding to the memory to be read, he sets the desired number of copies with the ten-key pad 254 and depresses the start key 253. The monitor mode is then executed.

When the RMU is included in the image processing system as described above, the retention, overlay, store and monitor modes can be selected at the reader.

When the RMU is connected to the reader, the operation mode is displayed on the operation unit of the reader, and all units connected in the system can be checked at the reader. Since the operator can easily adjust to system expansion or reduction and can access the RMU to set a desired operation, operability is greatly improved.

The operations and communication between the reader and the printer during image formation operation of the system in this embodiment will be described with reference to FIGS. 12A, 12B and 12C.

Column A shows manual operations and reader operations; Column B shows communication between the reader and the RMU; Column C shows the RMU operations; D shows communication between the RMU and the printer; Column E shows printer operations. Data exchange (excluding image information) between the respective components (i.e., between the reader and the RMU and between the RMU and the printer) is performed by serial signal communication.

The reader has priority over the RMU in serial communication between the reader and the RMU. The RMU has priority over the printer in serial communication between the RMU and the printer.

The sending side with priority detects whether the receiving side can receive the serial signal (by detecting a power-on signal and a reception acknowledge signal or the like at the receiving side). When the receiving side is set in the communication permission state, various instructions are sent as serial codes to the receiving side. The receiving side checks for parity error or the like. When a received instruction is effective, an acknowledge signal is sent back to the sending side (it should be noted that the RMU has different communication methods to be described later). When the instruction demands any operation of the receiving side, the operation is carried out in accordance with the instruction.

Communication is performed with one-to-on correspondence such that the sending side with the priority sends an instruction code (to be referred to as a command hereinafter), and command response information (to be referred to as status data hereinafter) is sent back from the receiving side.

FIG. 9 shows a basic flow of overall communication in the RMU. The reader unit communicates with the printer unit by exchanging 8-bit command and status data. The 8-bit command is sent from the reader unit to the printer unit, and the corresponding 8-bit status data is sent back from the printer unit to the reader unit. One status data is sent back in response to one command, and it is not sent back prior to sending of the command.

The RMU receives a command from the reader (S101). The RMU checks whether the command represents RMU indication data in Table 11 (to be described later) (S102). When the input command is determined to be the RMU command data, the RMU is started (S103). The RMU sends back a hole status output in Table 3 (to be described later) to the reader (S104) (In this case, the printer does not send a command to the printer).

When the RMU determines that the input command does not represent RMU indication data, it determines whether the command must be sent to the printer (S105). If NO in step S105, the whole status output is sent back to the reader (S104). However, if YES in step S105, the same command is sent to the printer (S106).

When the printer receives a command from the RMU, it sends back a corresponding status output to the RMU within a predetermined period of time. When the RMU receives the status output from the printer (S107), the RMU checks whether the status output is application status data (S108). If NO in step S108, the status data sent back from the printer is supplied to the reader (S110). However, if YES in step S108, data representing whether the RMU is connected in the system is added to application status data. Therefore, when the status data from the printer is application status data, the status data is processed for the RMU connection state (S109), and the processed status data is sent back to the printer (S110).

In this manner, the RMU transfers the command to the printer or sends back the whole status data to the reader when the RMU receives the command from the reader. When the RMU receives the status data sent back from the printer, the RMU sends back the status data to the reader with or without processing. The above operation is repeated as a cycle.

Information of each unit is coded and digital data is exchanged between the corresponding units. The memory unit receives only necessary data and transfers other data, thereby shortening data exchange time. Only the reader unit monitors communications, and thus communication protocols can be simplified.

The operations and communications in Table 12 will be described in detail.

Table 1 shows status requirement commands for requiring printer information. These commands are selectively sent to the printer through the RMU. When the printer receives a status requirement command, a corresponding one of the status signals (Tables 2 to 9) for the status requirement commands is sent back from the printer to the reader. Table 2 shows a command error status signal sent back from the printer to the reader when the received command is invalid. If, for example, a parity error occurs, bit 6 is set.

Table 3 shows printer states. A print request (bit 6) as a paper feed enable signal is set when the printer can feed a sheet. Bit 5 representing "feeding in process" is set while the sheet is being fed. Bits 4, 3, 2, and 1 which respectively represent "misprint", "waiting (during heating of a fixing unit)", "stop (shut-off and power failure)" and "call error (operator call or service man call)" are set when a printer error occurs.

Tables 4 and 5 show details of operator call error and service man call error, respectively. The bits corresponding to the types of errors in the drive units and processing units are set.

Table 6 shows the number of sheets to be fed again upon occurrence of a paper jam or misprinting.

Tables 7 and 8 show paper sizes of the printer.

Table 9 shows application status to cause bit 1 to notify the reader whether the RMU is connected. When the RMU is connected to the system, bit 1 is set, representing that the RMU is present.

Table 10 shows execution commands for printer operations. When an execution command is generated, the printer and the RMU send back the whole status data shown in Table 3.

Referring to Table 10, command 1 is a copy start command for starting copying. Command 2 is a printer stop command for stopping copying. Commands 3 and 4 are paper indication commands for indicating paper cassettes. Command 5 is an RMU indication command supplied from the reader when use of the RMU is set at the reader.

Table 11 shows the indication contents of the second byte of the RMU indication command 5 in Table 10. Bits 5 and 6 in the second byte indicate which one of the memories A and B in the RMU is to store the image signal. Bit 4 indicates that the image signal is to bypass the memory (or memories). Bits 2 and 3 indicate which one of the memories A and B is read-accessed. Therefore, in normal copying, bit 4 of the second byte is set to allow the image signal to bypass the memory. In the retention mode, bit 4 and the storage indication bit of the memory indicated by bits 5 and 6 are set. In the store mode, the storage indication bits of bits 5 and 6 are set in accordance with the indications at the operation unit. Furtheremore, in the monitor mode, bits 2 and 3 are set in accordance with the indications at the operation unit. In the overlay mode, bit 4 as the through indication bit, and bit 2 or 3 as the image output bit are set.

Serial communication using the commands described above will be described hereinafter.

While the copy sequence is not being executed and no key input is entered, the printer performs the communication shown in FIG. 12 prior to that shown in FIG. 11. The printer also performs selection of the signal HSBD in accordance with the flow chart in FIG. 10.

The reader generates an application status requirement command and receives the corresponding application status (S16-1) to detect whether the RMU is connected to the system. After the copy start is checked (S16-2), the reader detects sizes of the upper and lower cassettes in accordance with the status requirement commands of the upper and lower cassettes in Table 1 (S16-3).

After the reader receives paper size data or the like, it receives the whole status (S16-4) in accordance with the whole status requirement command. In this state, the copying sequence has not been performed. The reader only checks whether a call error is present in the whole status (S16-5). If NO in step S16-5, the flow returns to the application status requirement in step S16-1, and the above operation is repeated.

However, if YES in step S16-5, the detailed contents of the service man call error are obtained in accordance with the service man call error requirement command in Table 1 (S16-6). The details of the operator call error are obtained in accordance with the operator call error requirement command in Table 1 (S16-7). Thereafter, the flow returns to step S16-1, and the above operation is repeated.

When pre-sequence communication is performed and the copy start key is depressed by the copy start check (S16-2) in the manner described above, the operations in Table 12 are performed.

Communication during the copy sequence will be described with reference to Table 12.

Copying in the RMU operation mode is performed as shown in Table 12. RMU operation indication is performed at the reader, and one of the retention, overlay, store and monitor modes is set in accordance with the RMU indication.

Copying will be described for the case wherein the RMU is connected to the system.

When image formation conditions such as paper size and designation of the number of sheets (a single sheet in the store mode) are entered by the operator at the operation unit of the reader and the copy key is depressed, the reader sends an upper/lower cassette indication to the printer (or the RMU). The upper/lower cassette indication is fetched as a paper size by the RMU. The paper size data is then transferred from the RMU to the printer.

The reader sends a copy start command to the printer after sending the upper/lower cassette indication to the RMU. When the RMU receives the copy start command, copying operations are prepared for all modes other than the store mode. At the same time, the RMU sends the copy start command to the printer. When the printer receives the copy start command, the respective components in the printer are started. If the operating conditions of the printer allow reception of the image signal, a paper feed acknowledge signal representing that paper is feedable is supplied to the RMU. The RMU sends the paper feed acknowledge signal to the reader.

The above operation is for modes other than the store mode. In the store mode, however, the RMU sends the paper feed acknowledge signal directly to the reader without transferring the signal to the printer upon reception of the copy start signal from the reader.

As soon as the reader receives the paper feed acknowledge signal, it sends the paper feed start signal to the printer side (RMU).

The paper feed start signal is supplied to the printer through the RMU in all modes other than the store mode. For the second and subsequent sheets in the monitor and retention modes, the reader reads the image upon sending of the paper feed start signal. The read image is sent from the reader to the printer side (RMU).

The RMU controls the image signal in accordance with each RMU operation. Specifically, for the first copying sheet, the image signal is stored in the memory in the RMU and at the same time supplied to the printer. In the retention mode for the second and subsequent sheets, or in the monitor mode, the image signal is not sent from the reader side to the RMU. The RMU reads out the data as the image signal from the memory and sends the readout image signal to the printer. In the overlay mode, the image signal from the reader is synchronized with the signal from the memory, and the overlayed signal is sent as the image signal to the printer. It should be noted that the image signal is stored in the memory but is not supplied to the printer in the store mode.

When one image read cycle is completed, the reader counts down the number of sheets, i.e., the preset copy sheet number. When the reader receives the paper feed acknowledge signal again, it supplies the paper feed start signal to the RMU again. In the overlay mode, original reading is started. In the retention mode, only a timer corresponding to the output size is started, and original reading is not performed. In this case, the reader waits for the set time to elapse. In this manner, the reader repeats the above cycle until the preset copy sheet number reaches zero.

In the store mode, however, the preset copy sheet number is 1, and the image signal is not sent from the RMU to the printer. The reader completes its operation with one read cycle.

When the final copy is made, the reader sends a printer stop command to the printer through the RMU. When the printer receives the printer stop command, the respective components in the printer are disabled.

The reader operation using the RMU will be described with reference to the flow chart in FIG. 12.

When the operator depresses the copy key, the reader sends an RMU operation indication (S10-1) and an upper/lower cassette indication (S10-2) to the RMU. When the image signal is written in the memory A or B in the RMU, the reader sets a digitizer to generate a binary signal (S10-25 and S10-26). However, when the image signal is written in both the memories A and B, the reader sets the digitizer to generate a ternary signal (S10-27).

The reader then sends a copy start indication to the printer side (RMU) (S10-3). The reader checks whether the RMU monitor mode is set (S10-6). If NO in step S10-6 and when the paper feed acknowledge signal representing that the paper is feedable is received by the printer (S10-7), the reader sends the paper feed start indication (S10-8) to the printer side (RMU) to start timer 1 (S10-9). The reader waits for a predetermined period of time until the time of the timer 1 has elapsed (S10-10), starts optical scanning (S10-11), and starts reading of the original (S10-12). The reader then waits until reading of the original is completed (S10-13). However, in the RMU monitor mode, reading of the original is not performed. In this case, when the reader receives the paper feed acknowledge signal (S10-20), it sends the paper feed start signal (S10-21) and causes timer 2 to start (S10-22). The timer waits until time of the timer 2 has elapsed (S10-23).

The reader then checks whether the RMU store mode is set (S10-15). If YES in step S10-15, the reader sends the printer stop signal to the printer side to complete copying (S10-24). However, if NO in step S10-15, the reader counts down the preset copy sheet number (S10-16). Thereafter, the reader checks whether the count reaches zero (S10-17) so as to detect the end of copying. If YES in step S10-17, the reader sends the printer stop signal to the printer side to complete copying (S10-24).

However, if NO in step S10-17, the copying cycle is repeated until the count reaches zero. In this case, the reader checks whether the RMU retention mode is set (S10-18) and the RMU monitor mode (S10-19) is set. If YES in step S10-18 or S10-19, the flow advances to step S10-20 and thus the same copying steps as in the monitor mode are performed. The reader waits readout of the RMU. Otherwise, the flow returns to the step (S10-7) for copying of the first sheet, and the reader performs optical scanning.

When the reader determines in step S10-18 that the RMU retention mode is set, the images for the second and subsequent sheets are formed in accordance with the data read out from the memory. In this case, the reader need not scan the image of the original. Therefore, a message representing that the operator can remove the original from the original table is displayed (S10-28) on the display 256, as shown in FIG. 13-1, before the flow returns to the monitor copy mode (S10-

20). The operator can change the current original to the next original or turn the page and thus prepare for the next original scanning. As a result, copying operation time can be shortened. When only one original is to be copied, it can be removed by the operator after image scanning before copying for a large number of sheets is completed.

A message representing that an original can be replaced with another can be displayed on the display. Alternatively, visual display can be replaced with audio indication.

Such display can disappear when the original cover is opened to replace the current original with the next original or new key inputs are entered.

When the output from the reader is stored in the RMU and only the memory A or B is specified, the binary output is automatically generated by the reader, thus providing a system configuration with good operability wherein the operator need not pay attention for image omission. When the retention mode is set or the operator selects both the memories A and B, the reader automatically generate the ternary outputs.

The outputs from the memory unit are controlled by the reader, and the number of copied sheets can be checked by the operator. At the same time, processing load of the memory unit or the like can be decreased.

FIGS. 14A, 14B and 14C show the operation of a microcomputer in the printer when the image formation operation shown in Table 12 is performed. When the printer receives the copy start signal from the reader or the RMU, the respective components of the printer are started in accordance with the predetermined sequence (S12-2).

Since the image processing system of this embodiment uses an electrostatic recording type printer, preprocessing such as charging of a photosensitive drum or the like is required. The microprocessor in the printer waits until the paper is feedable after preprocessing is completed. When the paper is feedable, a sheet is fed from the cassette indicated by the reader before copying is started (S12-3 and S12-4).

The microprocessor in the printer waits until the fed sheet reaches the image signal receivable position (S12-5). When the sheet reaches this position, the microprocessor supplies the image signal receivable signal to the reader (S12-6).

When the image signal is received by the printer, a series of copying operations such as development, transfer of an image to a sheet and exhaust of the sheet outside the printer are operated (S12-7 and S12-8).

The microprocessor detects whether an error occurs during the series of operations and sends a detection signal to the reader (S12-9 and S12-10).

When the microprocessor in the printer receives the printer stop signal from the reader, the components in the printer are stopped to complete copying (S12-11 and S12-13). Subsequently, when the printer receives a copy start signal, it starts the next copying cycle (S12-12).

FIGS. 15(a) to 15(f) are respectively flow charts for explaining the RMU operations.

The RMU controls video signals while the ON/OFF states of the gates for the video signals and the video signal selector states are changed in accordance with different modes.

As shown in FIGS. 3A and 3B, the selectors 97 and 98 are arranged between the terminals of the two input signals VDA and VDB and the two memories A and B.

The selectors 97 and 98 select paths from four signal paths: paths from the input terminal of the signal VDA to the memory A, the input terminal of the signal VDA to the memory B, the input terminal of the signal VDB to the memory A and the input terminal of the signal VDB to the memory B. The selectors 92 and 93 and gates 72, 73, 100 and 101 are arranged between the two memories A and B and the terminals of the output video signals VDA and VDB, so as to select paths from four output paths from the memory A to the terminal of the output VDA, the memory A to the output VDB, the memory B to VDA, the memory B to VDA and the memory B to VDB. Direct signal lines are arranged to directly couple the input terminal of the signal VDA to the output terminal of the signal VDA and the input terminal of the signal VDB to the output terminal of the signal VDB without being through the memories A and B. A through-gate 99 is arranged midway along these signal lines. The RMU controls the states of the four selectors 92, 93, 97 and 98 and the gates 72, 73, 100 and 101 to select the input/output paths of the video signals.

FIG. 15(a) is a flow chart explaining selection of four RMU operation modes.

When a command from the reader side represents RMU indication data, the RMU is started according to this data (S103 in FIG. 9). The RMU operation modes are classified into the retention mode (S112), the overlay mode (S113), the store mode (S114) and the monitor mode (S115) in accordance with the RMU indication data (S111) from the reader unit.

Figure 15B:
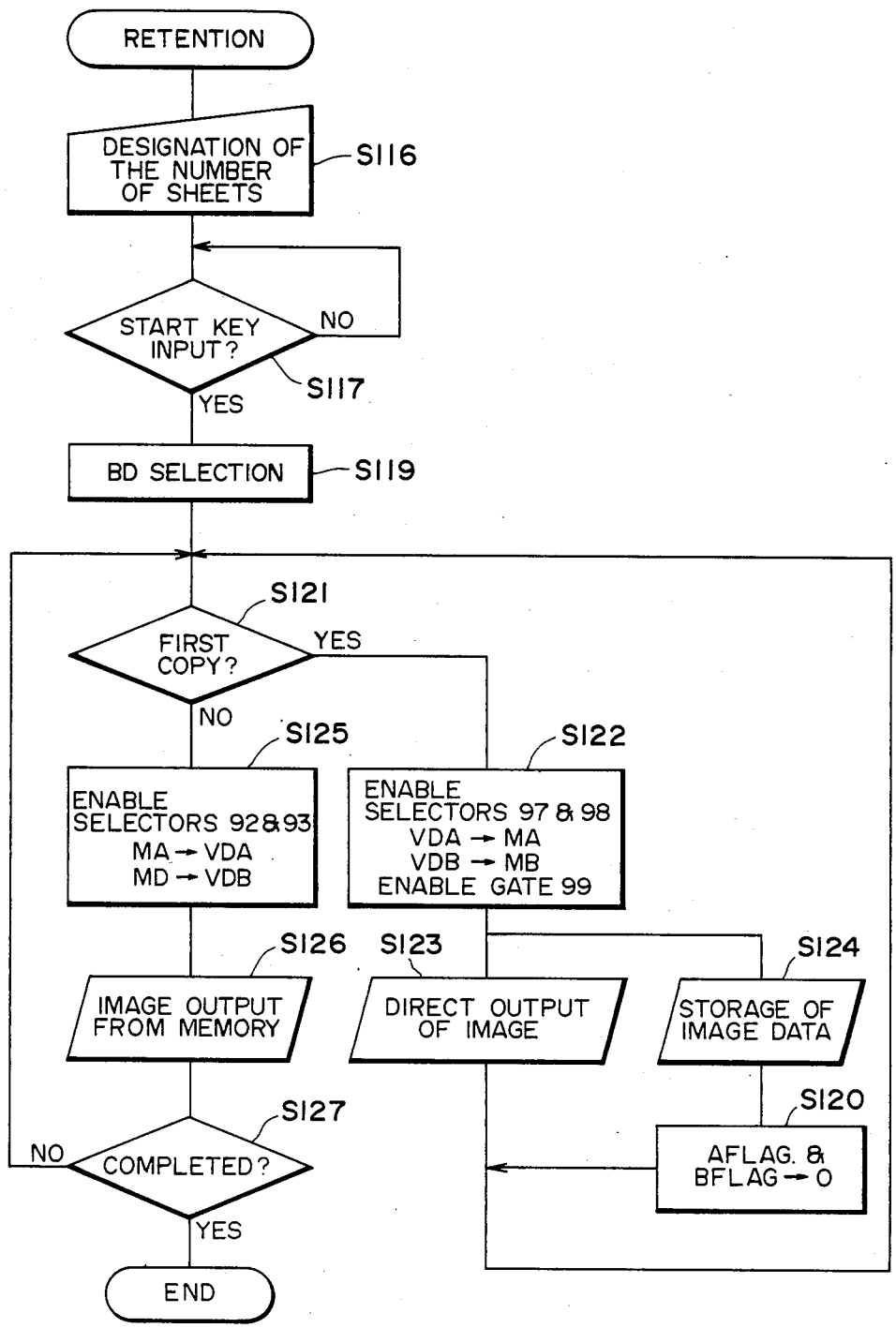

FIG. 15(b) shows the RMU operation in the retention mode. After the RMU receives the retention operation indication specified by the operator's key input operations at the operation unit, when the operator specifies the number of sheets or the preset copy sheet number (S116) and depresses the start key (S117), the retention operation is started.

Upon depression of the start key, the RMU selects the horizontal sync signal HSBD. More specifically, the RMU converts the signal BD from the printer to the horizontal sync signal (S119).

In the retention mode, for first-sheet image formation, the image signal read from the original is bypassed to the printer without being through the memory. For second- and subsequent-sheet image formation, the data stored in the memory at the time of first-sheet image formation is read out from the memory to perform high-speed retention operation without reading the original image again.

Figure 3:
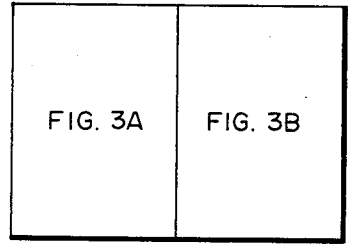

The RMU checks whether the current copying cycle is the first-sheet copying cycle (S121). If YES in step S121, the through-gate 99 is enabled to gate the read image, and the gates 97 and 98 are operated to store the input signals VDA and VDB respectively in the memories A (MA) and B (MB) (S122). Image signal bypassing (S123) and memory storage (S124) are simultaneously performed. Storage flags AFLAG and BFLAG in the RAM 77 in FIG. 3 are set to be logic "0" simultaneously with memory storage (S120). This indicates that the images are stored in the memories A and B in the retention mode. The flags AFLAG and BFLAG are used for protection of the memory (to be described later).

In second- and subsequent-sheet copying, the selectors 92 and 93 are operated to generate an output from the memory A (MA) at the output terminal of the signal VDA and an output from the memory B (MB) at the output terminal of the signal VDB (S125). The data read out from the memories A and B is output (S126), thereby performing retention. The image outputs from the memories are repeatedly generated until the preset copy sheet number reaches zero (S127).

In the retention mode, the reader performs reading only once irrespective of the preset copy sheet number, thereby providing a system with good operability.

Figure 15C:
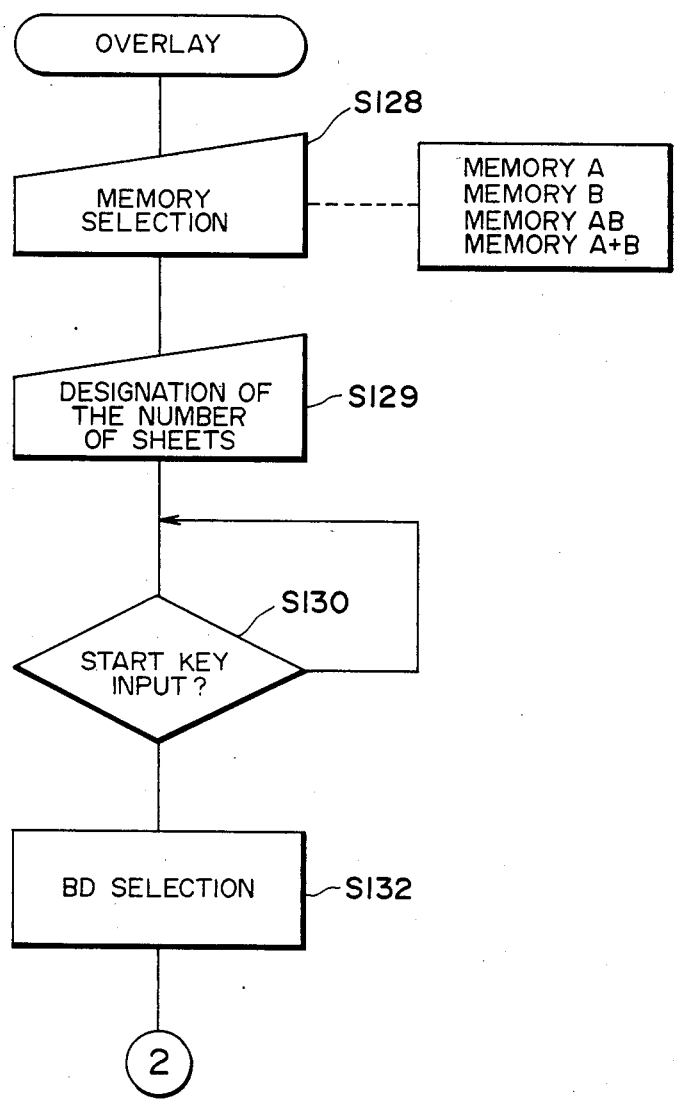
Figure 15D:
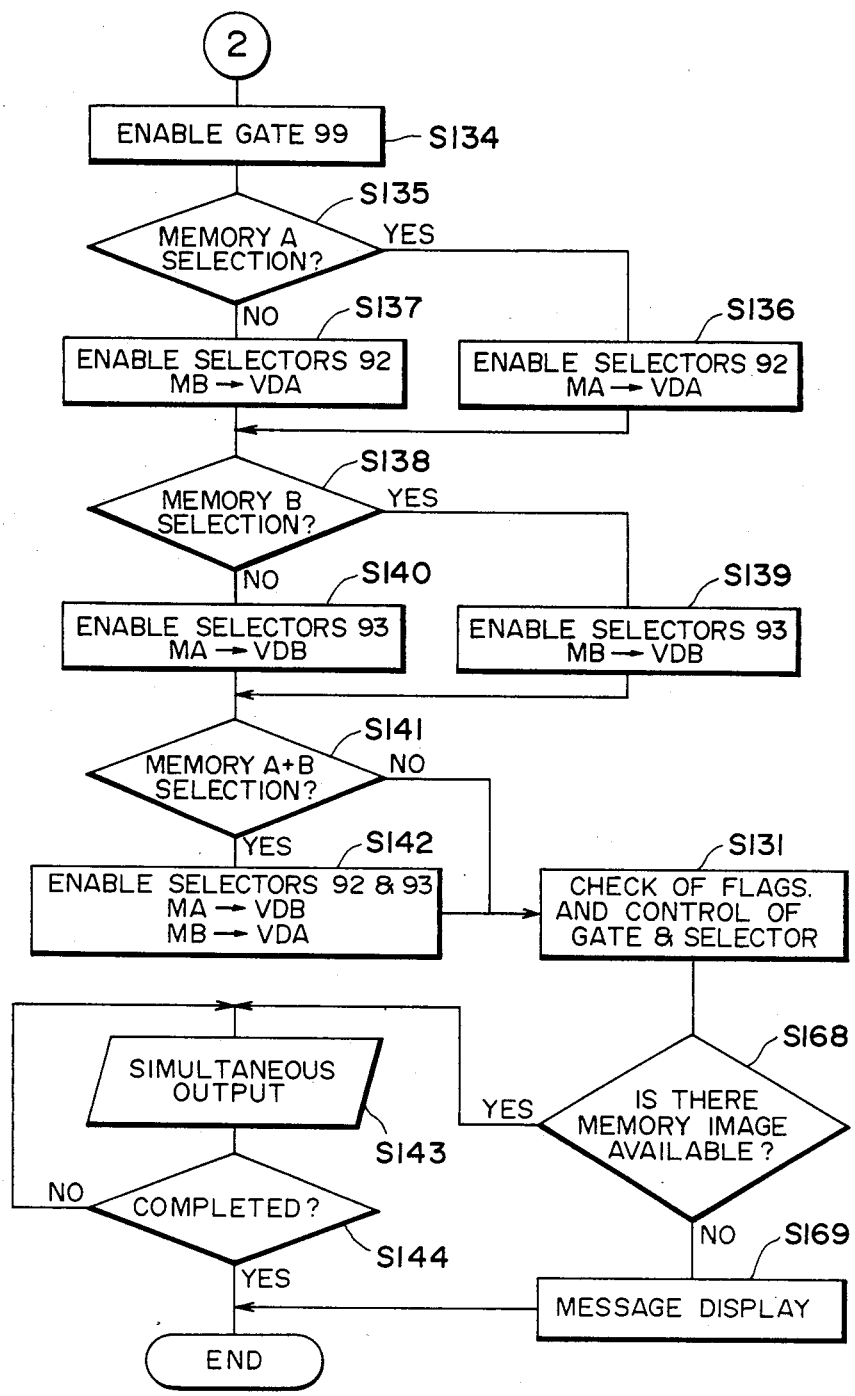

FIGS. 15(c) and 15(d) show the RMU operations in the overlay mode. When the user selects the overlay mode at the operation unit and performs memory selection (S128), the designation of the number of sheets (S130) and start key input (S130), the RMU starts the overlay operation. Memory selection (S128) designates an overlay between the original image and an image read out from the memory A, the memory B, the memory AB (one-page image data as the ternary data stored in the memories A and B and subjected to two-page overlay with the original image) and the memories A+B (two-page binary image data stored in the memories A and B and subjected to three-page overlay with the original image).

The RMU converts the signal BD from the printer to the horizontal sync signal (S132) after the start key is entered in the same manner as in the retention mode. This operation is the same as that in the retention mode.

The RMU sets the selectors in response to a memory select signal. In order to supply the original image data read by the reader to the printer side without being through the memory, the through-gate 99 is turned on (S134), and the selectors 92 and 93 are set to read out a desired video output from the memory in accordance with the content of memory selection (S128).

The RMU checks whether the memory A (including the memory AB and the memory A+B) is selected (S135). If YES in step S135, the selector 92 is operated to supply the image from the memory A (MA) to the output terminal of the signal VDA (S136). However, if NO in step S135, the selector 92 is operated to supply the image data from the memory B (MB) to the output terminal of the signal VDA (S137). Similarly, the RMU checks whether the memory B (including the memory AB and the memory A+B) is selected (S138). If YES in step S138, the selector 93 is operated to supply the output from the memory B (MB) to the output terminal of the signal VDB (S139). However, if NO in step S138, the selector 93 is operated to supply the image data from the memory A (MA) to the output terminal of the signal VDB.

The RMU then checks whether the memory A+B is selected (S141). If YES in step S141, the selectors 92 and 93 are operated to supply the image data from the memory A (MA) to the output terminal of the signal VDB and the image data from the memory B (MB) to the output terminal of the signal VDA (S142).

When the memory A+B is selected, all operations in steps S136, 139 and 142 are performed to perform three-page overlay between the original image and the two memory images (S142).

When the mode setting of each selector is completed, the storage flags are checked (S131). For example, when the flag AFLAG is set at logic "0", i.e., the image is stored in the memory A in the retention mode, the selectors and the gates are controlled so as not to output the image data from the memory A. In other words, if AFLAG=0 and only the memory A is selected, the selectors 92 and 93 set the output from the memory A to be VDA and VDB, and the gates 72, 73, 100 and 101 are controlled to inhibit all image outputs. In this case, only the image signal from the through-gate 99 is supplied from the RMU to the printer. When the memory AB is selected, the selector 92 is operated to set the image data from the memory A to be VDA, and the gates 73 and 100 are controlled to inhibit the image output from the memory A.

When the memory A+B is selected, the selectors 92 and 93 are operated to set only the image data from the memory B to be VDA and VDB, and the image output from the memory A is inhibited.

Table 13 shows the relationship between the contents of the flags AFLAG and BFLAG and the memory image overlayed with the bypassed image signals VDA and VDB in accordance with the control of the selectors and gates by the selected memory and with the control results. Referring to Table 13, a circle in each item for gate represents that the image output is permitted, and a cross represents that the image output is not permitted. Crosses in items for VDA and VDB represent that no image data from the memories is available.

With the above control operation, image data unintentionally stored by the operator in the retention copy mode cannot be accidentally read out from the memory, thereby guaranteeing secrecy and confidentiality of the image data.

The image stored in the memory in the memory store mode is intentionally stored by the operator in the memory. Since such data is desirably read out in the monitor or overlay mode, the above-mentioned flags are used for this purpose.

The image features are automatically discriminated by the memory access mode, thereby guaranteeing secrecy of the image data and improving operability of the system. The RMU checks upon setting of the respective gates whether a memory image to be overlayed with the original image is available (S168). When both VDA and VDB are set to be x marks in Table 13, no memory image is available to overlay, and copying is stopped, thereby preventing unnecessary copying (S169). In this case, an audio message representing that no memory image is available to overlay can be generated.

However, if a memory image is available to overlay, the RMU synchronizes the memory image with the original data sent without being through the memory, thereby performing the overlay operation (S143). The image outputs are repeated until the preset copy sheet number reaches zero (S144).

Figure 15E:
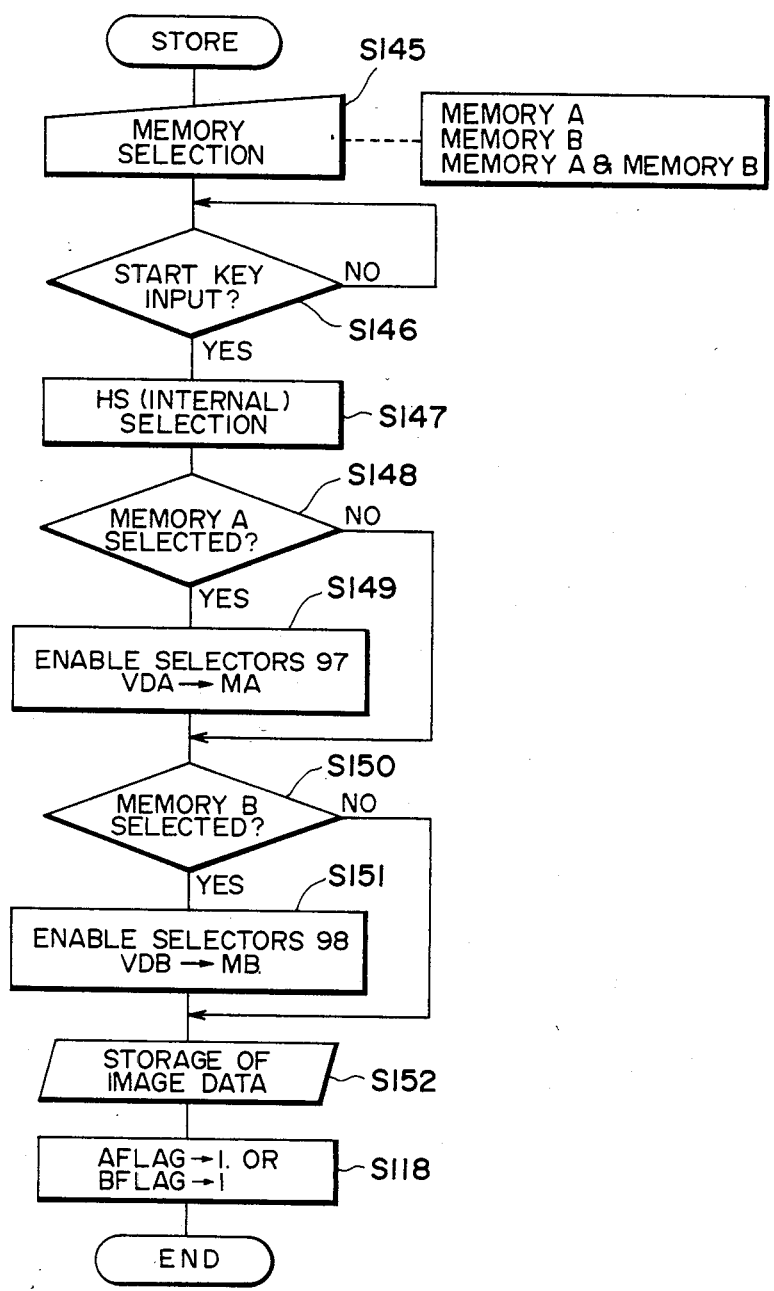

FIG. 15(e) is a flow chart for explaining the operation in the store mode. When the user or operator sets the store mode upon key inputs at the operation unit and performs memory selection (S145) and the start key input (S146), the RMU starts the store operation. Memory selection (S145) is performed to store the image data in one of the memory A, the memory B and the memory AB.

Upon depression of the start key, the signal HS generated by the RMU is selected as the horizontal sync signal (S147). The RMU then selects a memory for storing the image data.

For this purpose, the RMU checks whether the memory A (including the memory AB) is selected (S148). If YES in step S148, the selector 97 is operated to store the signal VDA in the memory A (MA) (S149). Similarly, the RMU then checks whether the memory B (including the memory AB) is selected (S150). If YES in step S150, the selector 98 is operated to set the VDB in the memory B (MB) (S151).

After the gate is selectively operate in accordance with the discrimination result, the image data is stored in the corresponding memory (S152). AFLAG=1 is given when the image data is stored in the memory A; and BFLAG=1 is given when the image data is stored in the memory B (S118). These flags are utilized to guarantee secrecy of memory images when a memory image is output in the overlay mode.

FIGS. 15(f)A and 15(f)B are flow charts for explaining the operation in the monitor mode. When the user selects the monitor mode and then performs memory selection (S153), the designation of the number of sheets (S154) and the start key input (S155) upon key inputs at the operation unit, the RMU is set in the monitor mode. Memory selection (S153) determines one of the memory A, the memory B and the memory AB which is accessed in the monitor mode.

Upon depression of the start key, the RMU selects as the horizontal sync signal the signal BD generated by the printer.

The RMU checks whether the memory A is selected (S159). If YES in step S159, the selector 92 is operated to generate the image data as VDA from the memory A (MA) (S160). However, if NO in step S159, the selector 92 is operated to generate the image data as VDA from the memory B (MB) (S161).

The RMU then checks whether the memory B is selected (S162). If YES in step S162, the selector 93 is operated to generate the image data as VDB from the memory B (MB) (S163). However, if NO in step S162, the selector 93 is operated to generate the image data as VDB from the memory A (MA) (S164).

As described with reference to overlay mode copying, the memory image storage flags are checked and the selectors and gates are controlled as shown in Table 13, so that the image unintentionally stored by an operator in the retention mode is not accidentally output from the memory (S156).

When the selectors and gates are properly set, the RMU checks whether a memory image is available to overlay (S157). When both VDA and VDB are set to be x marks in Table 13, no memory image is available to overlay with the original image and no overlayed image is displayed on the display 256, as shown in FIG. 13-3, and thus copying is interrupted (S167). If image data serving as at least one of the VDA and VDB is available, it is read out from the corresponding memory (S165), and the above operation is repeated until the preset copy sheet number reaches zero (S166).

In the image processing system for forming an image in response to an image signal output from an image output unit in the image reader, the image data storage unit is arranged to improve copying efficiency and a plurality of copies can be simultaneously formed by a single operation cycle, thus improving operability.

The stored image signal is not accidentally read out in a mode requiring data access, so that information secrecy or confidentiality can be guaranteed.

Furthermore, even if a plurality of copies for an identical image are formed, only single original scanning is required, so that the operator can immediately remove the original and replace the current original with the next original, thereby achieving high-speed image formation.

The present invention is exemplified by the particular preferred embodiment described above. However, the present invention is not limited to this, and various changes and modifications will be made within the spirit and scope of the appended claim.

TABLE 1

|   | Name | First Byte of Code | Second Byte of Code |
|---|---|---|---|
| 1 | Whole status requirement | 01H | None |
| 2 | Operator call error requirement | 02H | None |
| 3 | Service man call error requirement | 04H | None |
| 4 | Number of sheets required to be fed again | 08H | None |
| 5 | Lower cassette status requirement | 0BH | None |
| 6 | Upper cassette status requirement | 0DH | None |
| 7 | Application status requirement | 0EH | None |

*is hexadecimal

TABLE 2

| Command Error Status | |
|---|---|
| 7 | 1 |
| 6 | Parity error |
| 5 | — |
| 4 | — |
| 3 | — |
| 2 | — |
| 1 | — |
| 0 | Parity bit |

TABLE 3

| Status 1 (Whole Status) | |
|---|---|
| Bit 7 | 0 |
| Bit 6 | Print request |
| Bit 5 | Feeding in Process |
| Bit 4 | Misprint |
| Bit 3 | Waiting |
| Bit 2 | Stop |
| Bit 1 | Call error |
| Bit 0 | Parity bit |

TABLE 4

| Status 2 (Operator Call Error Status) | |
|---|---|
| Bit 7 | 0 |
| Bit 6 | No toner |
| Bit 5 | Exhaust toner overflow |
| Bit 4 | No paper |
| Bit 3 | Jam |
| Bit 2 | Sorter error |
| Bit 1 | — |
| Bit 0 | Parity bit |

TABLE 5

| Status 3 (Service Man Call Error Status) | |
|---|---|
| Bit 7 | 0 |
| Bit 6 | Fixing unit error |
| Bit 5 | BD error |
| Bit 4 | Scanner error |
| Bit 3 | Peltier error |
| Bit 2 | Drum motor error |
| Bit 1 | No counter |
| Bit 0 | Parity bit |

TABLE 6

| Status 4 (Status for the Number of sheets required to be Fed Again) | |
|---|---|
| Bit 7 | 0 |

TABLE 6-continued

Status 4 (Status for the Number of sheets required to be Fed Again)

| Bit 6 | Number of sheets required to be fed again |
|---|---|
| Bit 5 | Number of sheets required to be fed again |
| Bit 4 | Number of sheets required to be fed again |
| Bit 3 | Number of sheets required to be fed again |
| Bit 2 | Number of sheets required to be fed again |
| Bit 1 | Number of sheets required to be fed again |
| Bit 0 | Parity bit |

TABLE 7

Status 5 (Lower Cassette Paper Size Status)

| Bit 7 | 0 |
|---|---|
| Bit 6 | Paper size |
| Bit 5 | Paper size |
| Bit 4 | Paper size |
| Bit 3 | Paper size |
| Bit 2 | Paper size |
| Bit 1 | Paper size |
| Bit 0 | Parity bit |

TABLE 8

Status 6 (Upper Cassette Paper Size Status)

| Bit 7 | 0 |
|---|---|
| Bit 6 | Paper size |
| Bit 5 | Paper size |
| Bit 4 | Paper size |
| Bit 3 | Paper size |
| Bit 2 | Paper size |
| Bit 1 | Paper size |
| Bit 0 | Parity bit |

TABLE 9

Status 7 (Application Status)

| Bit 7 | 0 |
|---|---|
| Bit 6 | — |
| Bit 5 | — |
| Bit 4 | — |
| Bit 3 | — |
| Bit 2 | — |
| Bit 1 | With RMU |
| Bit 0 | Parity bit |

TABLE 10

| | Name | First Byte of Code | Second Byte of Code |
|---|---|---|---|
| 1 | Copy start | 49H | NONE |
| 2 | Printer stop | 4AH | NONE |
| 3 | Lower cassette paper feed indication | 51H | NONE |
| 4 | Upper cassette paper feed indication | 52H | NONE |
| 5 | Retention memory unit indication | 89H | Table 11 |

TABLE 11

Retention Memory Unit Indication Command

| Bit 7 | 0 |
|---|---|
| Bit 6 | Storage in memory A |
| Bit 5 | Storage in memory B |
| Bit 4 | Bypassed image signal |
| Bit 3 | Output from memory A |
| Bit 2 | Output from memory B |
| Bit 1 | 0 |
| Bit 0 | Parity bit |

TABLE 12

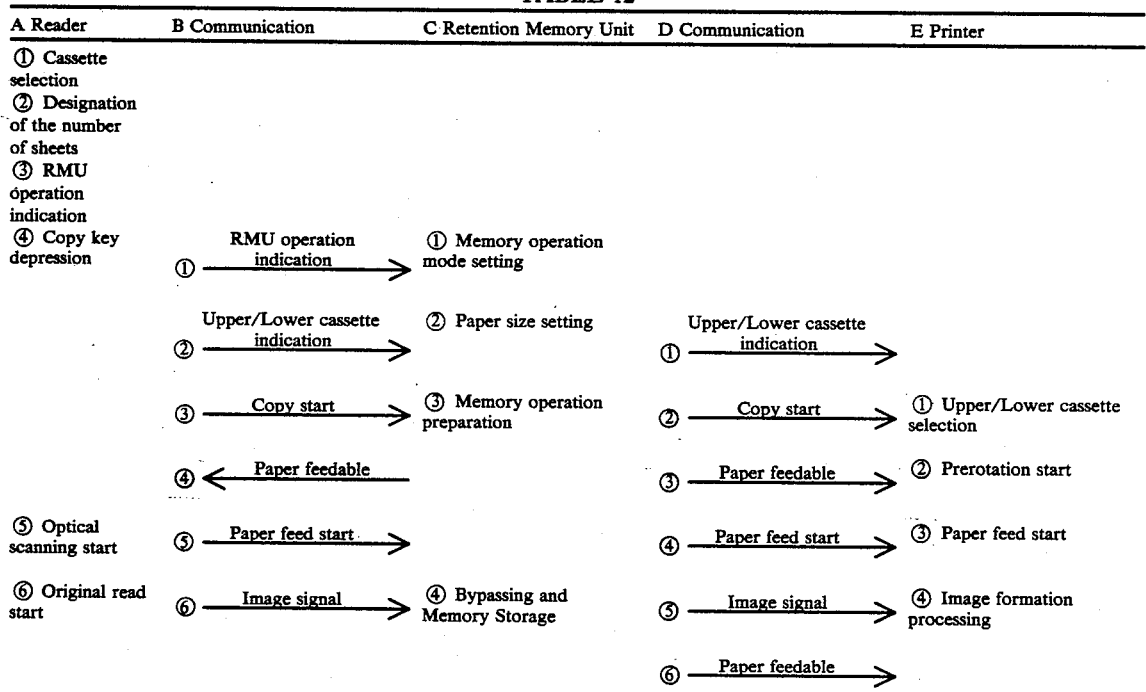

TABLE 12-continued

| A Reader | B Communication | C Retention Memory Unit | D Communication | E Printer |
|---|---|---|---|---|
| ⑦ Count-down of the preset copy sheet number | ⑦ ← Paper feedable | ⑤ Readout mode setting | ⑦ — Paper feed start → | ⑤ Feed paper |
| ⑧ Count-down of the preset copy sheet number | ⑧ — Paper feed start → | ⑥ Read start | ⑧ — Image signal → | ⑥ Image formation processing |
| ⑨ Check of the number of copied sheets | ⑨ — Printer stop → | ⑦ Mode resetting | ⑨ — Printer stop → | ⑦ Printer stop |

TABLE 13

| Selected Memory | A FLAG | B FLAG | Selector 92 | Gate 73 | Gate 100 | Gate 93 | Gate 72 | Gate 101 | VDA | VDB |
|---|---|---|---|---|---|---|---|---|---|---|
| A | 1 | 1 | M A | X | O | M A | X | O | M A | M A |
|   | 1 | 0 |     | X | O |     | X | O | M A | M A |
|   | 0 | 1 |     | X | X |     | X | X | X | X |
|   | 0 | 0 |     | X | X |     | X | X | X | X |
| B | 1 | 1 | M B | X | O | M B | X | O | M B | M B |
|   | 1 | 0 |     | X | X |     | X | X | X | X |
|   | 0 | 1 |     | X | O |     | X | O | M B | M B |
|   | 0 | 0 |     | X | X |     | X | X | X | X |
| A B | 1 | 1 | M A | X | O | M B | X | O | M A | M B |
|   | 1 | 0 |     | X | O |     | X | X | M A | X |
|   | 0 | 1 |     | X | X |     | X | O | X | M B |
|   | 0 | 0 |     | X | X |     | X | X | X | X |
| A + B | 1 | 1 | M A | O | O | M B | O | O | MA + MB | MA + MB |
|   | 1 | 0 |     | O | O |     | X | X | M A | M A |
|   | 0 | 1 |     | X | X |     | O | O | M B | M B |
|   | 0 | 0 |     | X | X |     | X | X | X | X |

What is claimed is:

1. An image processing system comprising:
   input means for inputting an image signal;
   storage means for storing the image signal of at least one page input by said input means;
   readout means for reading out the image signal from said storage means; and
   control means for controlling reading out of the image signal from said storage means by said readout means, said control means being operable to control said readout means in either a first mode, in which the image signal is read out from said storage means at an arbitrary time after completion of storage of the image signal in said storage means, or a second mode, in which the image signal is read out from said storage means at a specified time after completion of storage of the image signal in said storage means,
   wherein said control means inhibits the image signal read out from said storage means in the second mode from being read out from said storage means by said readout means in the first mode.

2. A system according to claim 1, wherein said input means comprises reading means for photoelectrically reading an original image and generating the image signal to represent the original image.

3. A system according to claim 1, further comprising setting means for setting a mode for reading out of the image signal by said readout means.

4. A system according to claim 1, further comprising recording means for recording an image on a recording medium in accordance with the image signal read out from said storage means.

5. A system according to claim 1, further comprising instruction means for instructing a reading out of the image signal from said storage means.

6. A system according to claim 1, wherein, in the second mode, said control means causes said readout means to read out the image signal from said storage means following completion of storage of the image signal in said storage means.

7. An image processing system comprising:
   input means for inputting an image signal;
   storage means for storing the image signal of at least one frame;
   readout means for reading out the image signal from said storage means; and
   synthesizing means for synthesizing the image signal entered from said input means and the image signal read out from said storage means,
   wherein said readout means is operable in either a first mode, in which the image signal is read out from said storage means at an arbitrary time, or a second mode, in which the image signal is read out from said storage means at a specified time, and
   wherein the image signal read out from said storage means in the second mode is inhibited from being read out from said storage means by said readout means in the first mode and being synthesized by said synthesizing means with the image signal entered from said input means.

8. A system according to claim 7, wherein said storage means stores the image signal entered from said input means.

9. A system according to claim 7, wherein said input means comprises image reading means for photoelectrically reading an original image and generating the image signal to represent the original image.

10. A system according to claim 7, further comprising recording means for recording an image on a recording medium in accordance with a synthesized image from said synthesizing means.

11. A system according to claim 7, wherein said readout means is operable to read out the image signal from said storage in synchronism with entry of the image signal.

12. A system according to claim 7, further comprising instruction means for instructing a synthesizing operation by said synthesizing means.

13. A system according to claim 7, wherein, in the second mode, said readout means reads out the image signal from said storage means following completion of storage of the image signal in said storage means.

14. A system according to claim 7, further comprising setting means for setting a mode for reading out of the image signal by said readout means.

* * * * *

UNITED STATES PATENT AND TRADEMARK OFFICE
CERTIFICATE OF CORRECTION

PATENT NO. : 4,748,513

DATED : May 31, 1988

INVENTOR(S) : MASANORI YAMADA

It is certified that error appears in the above-identified patent and that said Letters Patent is hereby corrected as shown below:

IN THE DRAWINGS

Sheet 5, Figure 3A, "ADDRESS " should read --ADDRESS --.
            GAN. CCT                        GEN. CCT

COLUMN 1

Line 60, "DETAILED" should read --BRIEF--.

COLUMN 2

Line 29, "BRIEF" should read --DETAILED--.
Line 45, "2 t 6." should read --2 to 6.--.
Line 59, "converter" should read --converters--.

COLUMN 3

Line 47, "CCD" should read --CCDs--.

COLUMN 4

Line 58, "RM 2" should read --RMU 2--.

COLUMN 5

Line 6, "B 6." should read --B 86.--.
Line 25, "VLCK" should read --VCLK--.

COLUMN 6

Line 32, "I" should read --In--.

UNITED STATES PATENT AND TRADEMARK OFFICE
CERTIFICATE OF CORRECTION

PATENT NO. : 4,748,513
DATED : May 31, 1988
INVENTOR(S) : MASANORI YAMADA

It is certified that error appears in the above-identified patent and that said Letters Patent is hereby corrected as shown below:

COLUMN 8

Line 62, "(srorage" should read --(storage--.

COLUMN 9

Line 46, "retension" should read --retention--.

COLUMN 10

Line 28, "D" should read --Column D--.
Line 52, "one-to-on" should read --one-to-one--.

COLUMN 11

Line 3, "hole" should read --whole--.
Line 4, "(S104)" should read --(S104).--.

COLUMN 15

Line 22, "generate" should read --generates--.

COLUMN 17

Line 55, "139 and 142" should read --S139 and S142--.

COLUMN 19

Line 1, "operate" should read --operated--.

UNITED STATES PATENT AND TRADEMARK OFFICE
CERTIFICATE OF CORRECTION

PATENT NO. : 4,748,513

DATED : May 31, 1988

INVENTOR(S) : MASANORI YAMADA

It is certified that error appears in the above-identified patent and that said Letters Patent is hereby corrected as shown below:

COLUMN 20

Line 1, "will" should read --can--.
    Line 2, "claim." should read --claims.--.
    Table 1, "First Byte of Code" should read --First Byte of Code*--.

COLUMN 24

Line 59, "being" should read --from being--.

COLUMN 25

Line 9, "said storage" should read --said storage means--.

Signed and Sealed this

Third Day of January, 1989

Attest:

DONALD J. QUIGG

Attesting Officer      Commissioner of Patents and Trademarks